(12) United States Patent
Whiteford et al.

(10) Patent No.: US 10,155,594 B2
(45) Date of Patent: *Dec. 18, 2018

(54) AIRCRAFT ENGINE MOUNTING SYSTEM AND METHOD OF MOUNTING AIRCRAFT ENGINES

(71) Applicant: LORD Corporation, Cary, NC (US)

(72) Inventors: Gerald P. Whiteford, Waterford, PA (US); Daniel Zameroski, McKean, PA (US)

(73) Assignee: LORD Corporation, Cary, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/654,893

(22) Filed: Jul. 20, 2017

(65) Prior Publication Data

US 2017/0327239 A1   Nov. 16, 2017

Related U.S. Application Data

(63) Continuation of application No. 15/356,060, filed on Nov. 18, 2016, now Pat. No. 9,745,073, which is a continuation of application No. 13/146,286, filed as application No. PCT/US2010/000192 on Jan. 26, 2010, now Pat. No. 9,527,598.

(60) Provisional application No. 61/147,327, filed on Jan. 26, 2009.

(51) Int. Cl.
*B64D 27/26* (2006.01)
*B64D 27/02* (2006.01)

(52) U.S. Cl.
CPC ............. *B64D 27/26* (2013.01); *B64D 27/02* (2013.01); *B64D 2027/262* (2013.01)

(58) Field of Classification Search
CPC ............. B64D 27/26; B64D 2027/262; B64D 2027/266
See application file for complete search history.

(56) References Cited

U.S. PATENT DOCUMENTS

| 4,603,822 A | 8/1986 | Chee |
| 4,634,081 A | 1/1987 | Chee |
| 4,805,851 A | 2/1989 | Herbst |
| (Continued) | | |

FOREIGN PATENT DOCUMENTS

| EP | 0 940 337 | 9/1999 |
| FR | 2900906 | 11/2007 |
| WO | 95/34769 | 12/1995 |

*Primary Examiner* — Brian M O'Hara

(57) ABSTRACT

The invention includes an aircraft engine mounting system for mounting an aircraft engine to an aircraft. The mounting system includes a yoke member having a first end and a second end, with an aircraft attachment between the first end and the second end, the aircraft attachment for interfacing the yoke member with the aircraft, the yoke member having a yoke member length (YL) from the first end to the second end. The mounting system preferably includes a first engine mount, the yoke member first end contained by the first engine mount, with the first engine mount having first engine mount housing grounded to the aircraft engine. The mounting system preferably includes a second engine mount, the yoke member second end contained by the second engine mount, with the second engine mount having a second engine mount housing grounded to the aircraft engine.

12 Claims, 45 Drawing Sheets

(56) References Cited

U.S. PATENT DOCUMENTS

| | | | |
|---|---|---|---|
| 5,176,339 A * | 1/1993 | Schmidt | B64D 27/00 |
| | | | 244/131 |
| 5,351,930 A | 10/1994 | Gwinn et al. | |
| 5,551,650 A * | 9/1996 | Southward | F16F 1/40 |
| | | | 244/1 N |
| 5,687,948 A | 11/1997 | Whiteford et al. | |
| 5,730,429 A | 3/1998 | Ivers et al. | |
| 5,873,559 A | 2/1999 | von Flotow et al. | |
| 6,607,165 B1 | 8/2003 | Manteiga et al. | |
| 6,843,449 B1 | 1/2005 | Manteiga et al. | |
| 7,267,301 B2 | 9/2007 | Dron | |

* cited by examiner

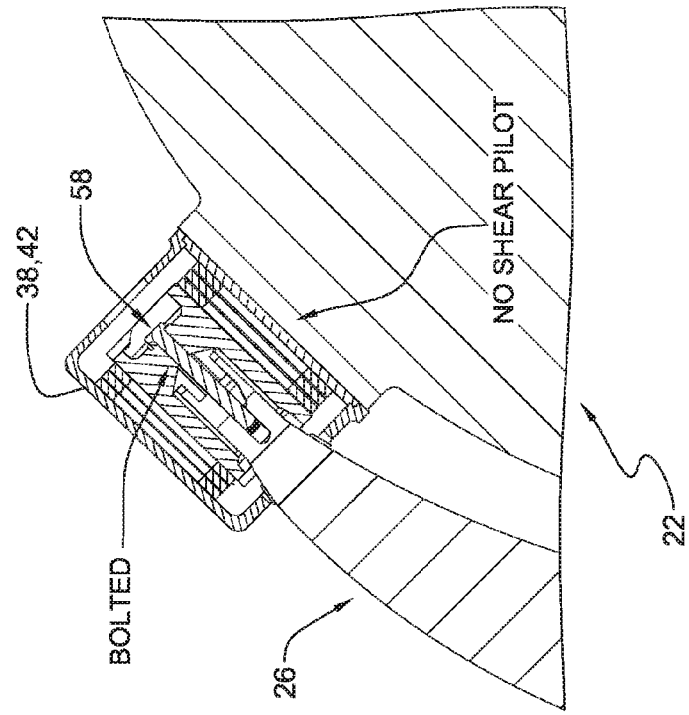
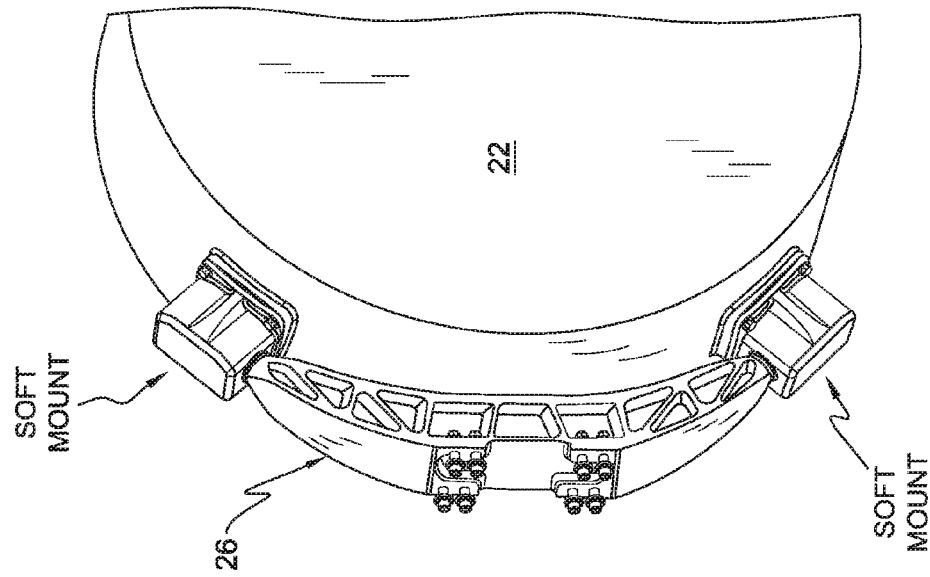
FIG. 20

AFT ENGINE MOUNT AND FORWARD YOKE

FORWARD MOUNT YOKE WITH YOKE ARM BOLTS AND FASTENED ENGINE MOUNTS

AFT ENGINE MOUNT WITH LINK ASSEMBLY WITH TWO
LINK ARMS GROUNDED TO ENGINE RING

AFT HOUSING THIRD AFT ENGINE MOUNT AIRFRAME STRUCTURE HOUSING MEMBER INCLUDES AN ARCHED VOID CRACK STOP BETWEEN THE PRIMARY LOAD PATH WITH THE LINK ASSEMBLY AND SECONDARY LOAD PATH WITH THE LINK ASSEMBLY

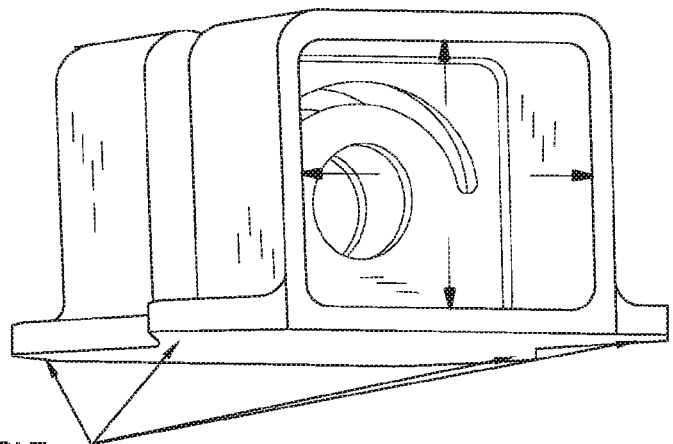

LOADS FROM ELASTOMERIC PACKAGE INTO HOUSING WALLS ON EACH SIDE OF HOUSING. DUAL PRIMARY LOAD PATHS

FOUR BOLT ATTACHMENT WITH CAPABILITY TO WITHSTAND LOADING WITH ONE BOLT OUT FOR 3 INSPECTION INTERVALS WITH RESIDUAL STRENGTH

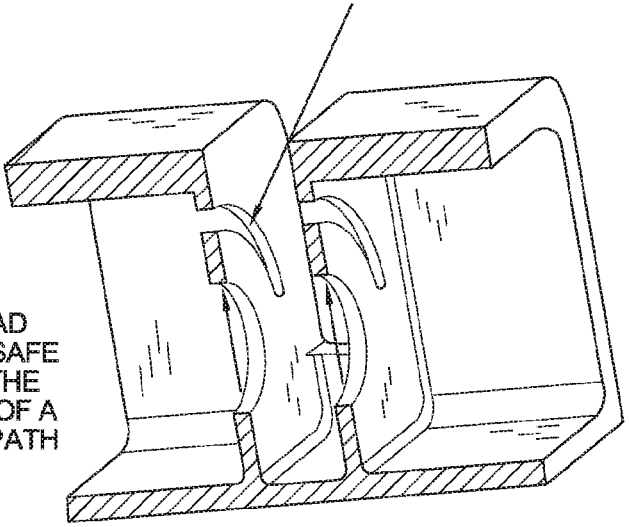

CRACK STOP FEATURE ISOLATING THE PRIMARY AND SECONDARUIY LOAD PATH

SNUBBING LOAD PATH AND FALL-SAFE LOAD PATH IN THE EVENT OF LOSS OF A PRIMARY LOAD PATH

AFT MOUNT HOUSING LOADING PATHS WITH CRACK STOP

FIG. 36

AFT MOUNT LINK TO ISOLATOR WITH FAILSAFE
BOLT-IN-SLEEVE

AFT MOUNT LINK ASSEMBLY

INTEGRAL FITTING YOKE INTO MOUNT WITH YOKE ARM
BOLT RECEIVING YOKE ATTACHMENT BOLT FASTENER

YOKE CROSS - SECTION SHOWING ENGINE END YOKE ARM BOLTS

FORWARD MOUNT INTERNALS WITH YOKE ATTACHMENT BOLT
FASTENER FOR RECEPTION IN THE YOKE ARM BOLT END

FORWARD MOUNTING SYSTEM LOAD PATH

INSTALLATION METHOD

AIRCRAFT ENGINE MOUNTING SYSTEM AND METHOD OF MOUNTING AIRCRAFT ENGINES

CROSS REFERENCE TO RELATED APPLICATIONS

This application is a continuation, claims the priority of and incorporates by reference U.S. patent application Ser. No. 15/356,060, filed Nov. 18, 2016 and entitled AIRCRAFT ENGINE MOUNTING SYSTEM AND METHOD OF MOUNTING AIRCRAFT, U.S. patent application Ser. No. 13/146,286, filed Jul. 26, 2011 now U.S. Pat. No. 9,527,598, issued Dec. 27, 2016 and entitled AIRCRAFT ENGINE MOUNTING SYSTEM AND METHOD OF MOUNTING AIRCRAFT ENGINES, which is a 371 international application of International Application No. PCT/US2010/000192, filed on Jan. 26, 2010 and U.S. Provisional Patent Application 61/147,327 and entitled AIRCRAFT ENGINE MOUNTING SYSTEM AND METHOD OF MOUNTING AIRCRAFT ENGINES filed Jan. 26, 2009.

BACKGROUND

The invention relates generally to aircraft engine mounting systems for mounting aircraft engines to an aircraft using fewer parts and providing for interlocking elements to secure the engine.

SUMMARY

The following disclosure describes one embodiment of an aircraft engine mounting system 20 for mounting an aircraft engine 22 to an aircraft 24. The aircraft engine mounting system 20 comprises a yoke member 26 having a first end 28 and a second end 30, with an aircraft attachment 34 between first end 28 and second end 30. The aircraft attachment 34 provides an interface between the yoke member 26 member and the aircraft 24. Yoke member 26 has a yoke member length YL from first end 28 to second end 30. The aircraft engine mounting system further includes a first engine mount 36 with first end 28 of yoke member 26 contained within first engine mount 36. First engine mount 36 has an outer engine mount housing 38 grounded to aircraft engine 22. The aircraft engine mounting system further includes a second engine mount 40 with second end 30 contained within second engine mount 40. Second engine mount 40 has an outer engine mount housing 42 grounded to aircraft engine 22. First engine mount 36 and second engine mount 40 are grounded to aircraft engine 22 and spaced apart a distance referred to as mounts spacing (MS) such that first engine mount 36 and second engine mount 40 retain yoke member 26 between first engine mount 36 and second engine mount 40 in an interlocking relationship based on distances YL and MS.

Also disclosed herein is a method for attaching an aircraft engine 22 to an aircraft 24. The method includes the step of providing a yoke member 26 having a first end 28 and a second end 30. The yoke member 26 has an aircraft attachment point 34 located between first end 28 and second end 30. Yoke member 26 has a yoke member length YL from first end 28 to second end 30. The method also provides first engine mount 36, second engine mount 40, an aircraft engine 22, having a first engine mounting mate 66 for mating with an alignment boss 64 carried by first engine mount 36. The aircraft engine 22 also includes a second mounting mate 66 for mating with second engine mount 40. The first engine mounting mate 66 is spaced from second engine mounting mate 66 to provide a mounting mate spacing MMS. The method further includes the step of connecting yoke member 26 to aircraft engine 22 with first engine mount 36 and second engine mount 40. The step of connecting includes mating first engine mounting mating 66 with first engine mount 36 and second engine mounting mating member 66 with second engine mount 40. The step of connecting includes locating first end 28 and second end 30 of yoke member 26 within the respective first and second engine mounts such that first engine mount 36 and second engine mount 40 retain yoke member 26 between first engine mount 36 and second engine mount 40 in an interlocking relationship based on distances YL and MS.

BRIEF DESCRIPTION OF THE DRAWINGS

FIG. 20 illustrates an alternative of the yoke member captured by the engine mounting system using two soft mounts.

FIG. 36 illustrates a perspective and sectional view of aft mount housing load paths with crack stop.

DETAILED DESCRIPTION

Figure 1:
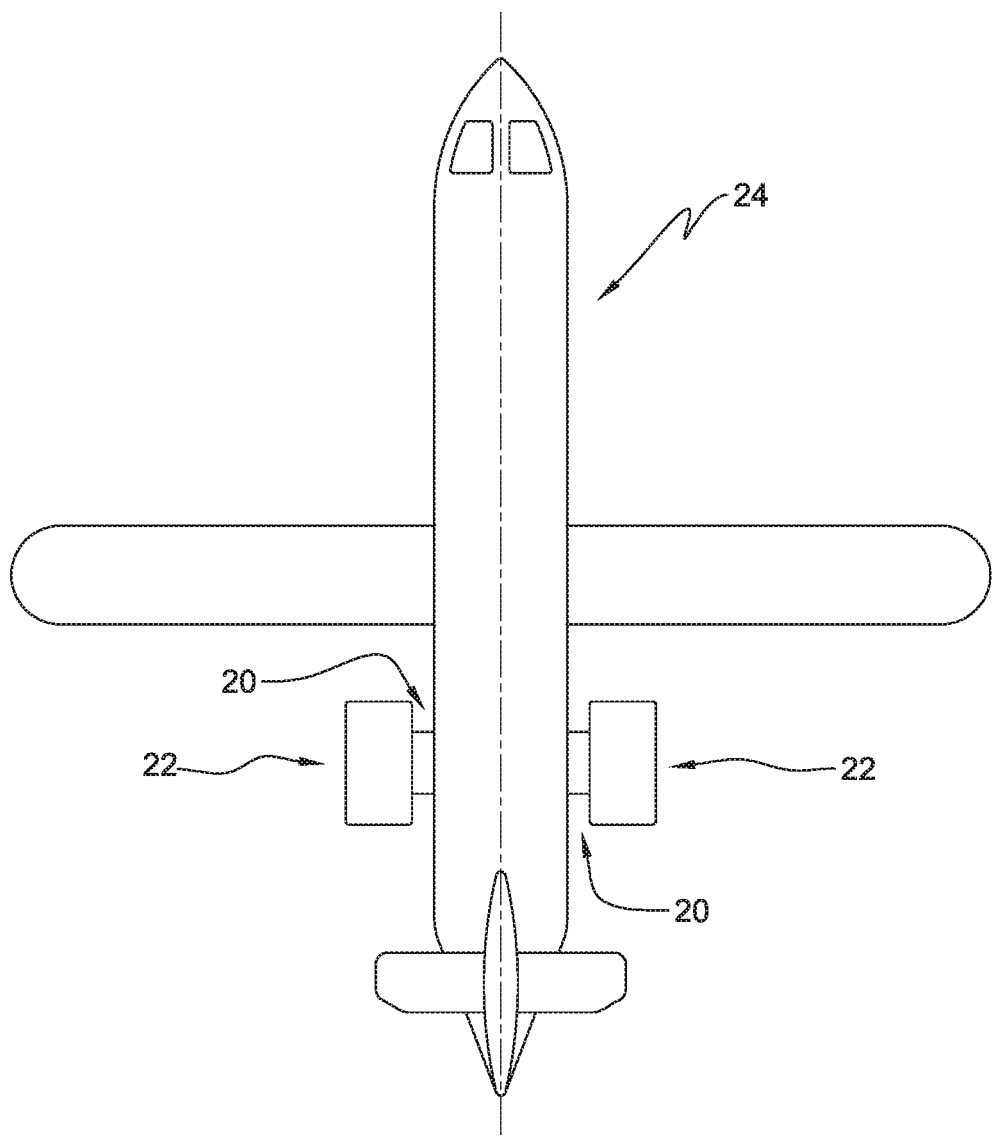
FIGS. 1 and 2 are top views of an aircraft with the inventive engine isolation system.
Figure 2:
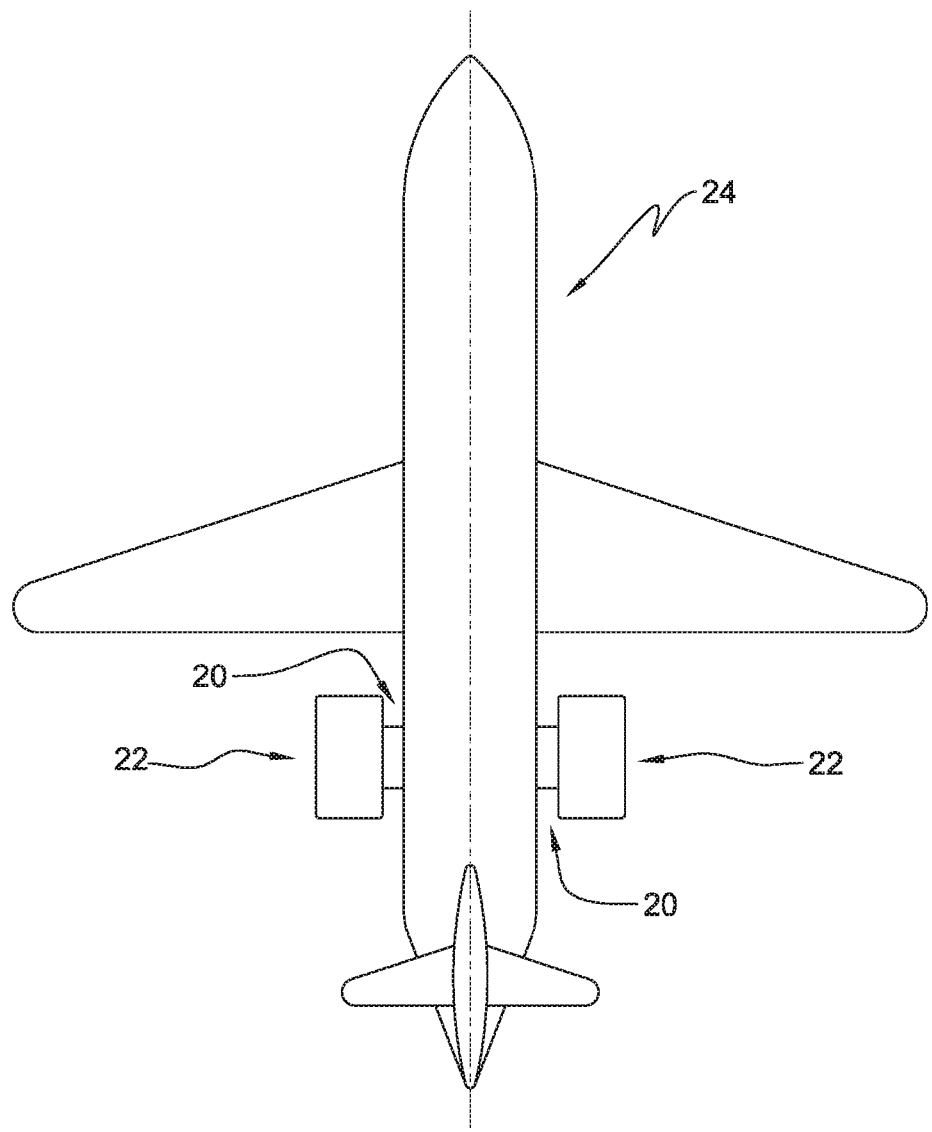

With reference to the FIGS., this specification describes an aircraft engine mounting system 20 suitable for securing an aircraft engine 22 to an aircraft 24. Engine mounting system 20 improves safety during installation of aircraft engine 22 to aircraft 24 and during subsequent operation of aircraft 24. As discussed in more detail below, aircraft engine mounting system 20 provides a configuration wherein a yoke member 26 and a pair of forward engine mounts 36, 40 have interlocking metal components upon final assembly.

In the discussion below, the following defined terms are used: aircraft attachment width dimension (AAWD); first engine end width dimension (FEEWD); second engine end width dimension (SEEWD); mounts spacing (MS); mounting mate spacing (MMS); yoke length (YL). Note: FEEWD and SEEWD are in reference to the dimensions of yoke member 26 adjacent to forward engine mounts 36, 40. For clarity, FEEWD1, SEEWD1 and AAWD1 refer to the thickness at each indicated point and FEEWD2, SEEWD2 and AAWD2 refers to the width at each indicated point. Additionally, the terms soft mount and hard mount are used in this specification. The term soft mount refers to an engine mount having vibration damping material, e.g. an elastomeric material, incorporated into the engine mount. The term hard mount refers to an engine mount that does not include vibration damping material.

Figure 3:
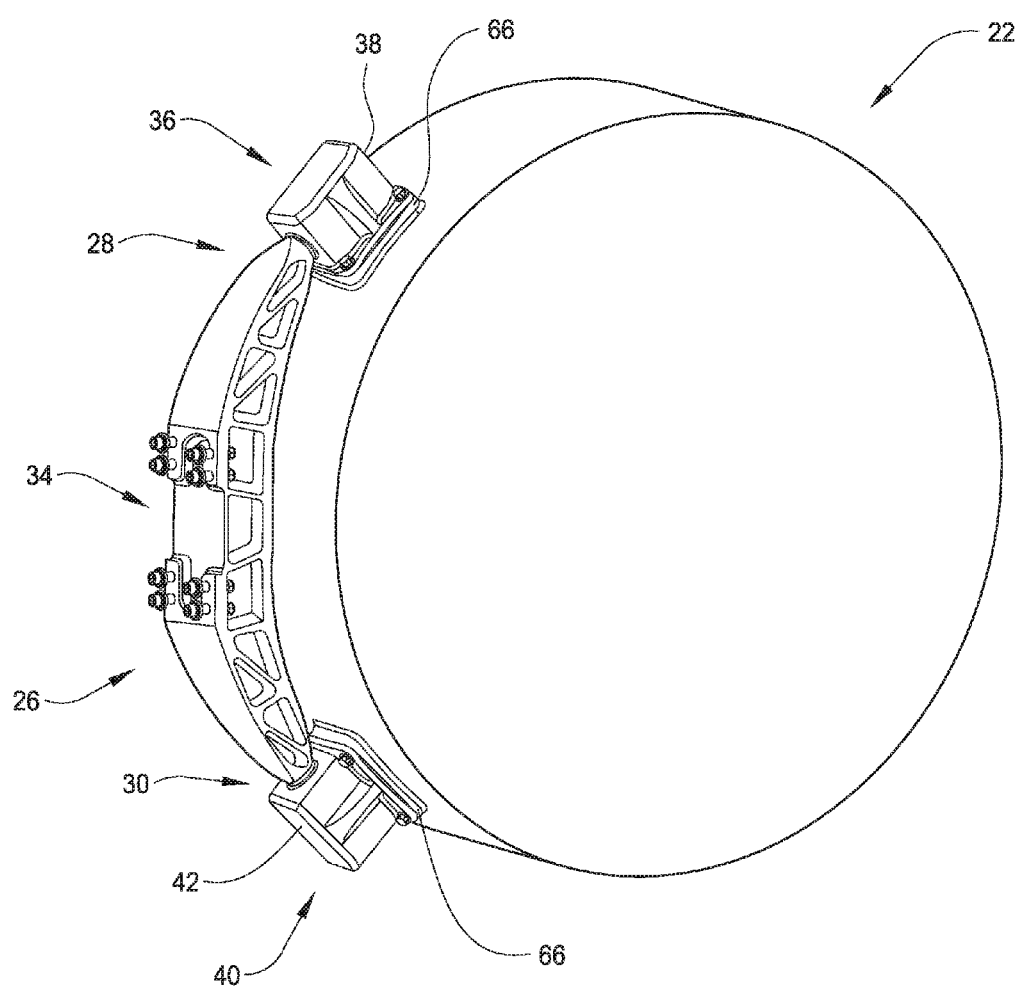
FIGS. 3 and 4 are perspective views of the engine isolation system.
Figure 4:
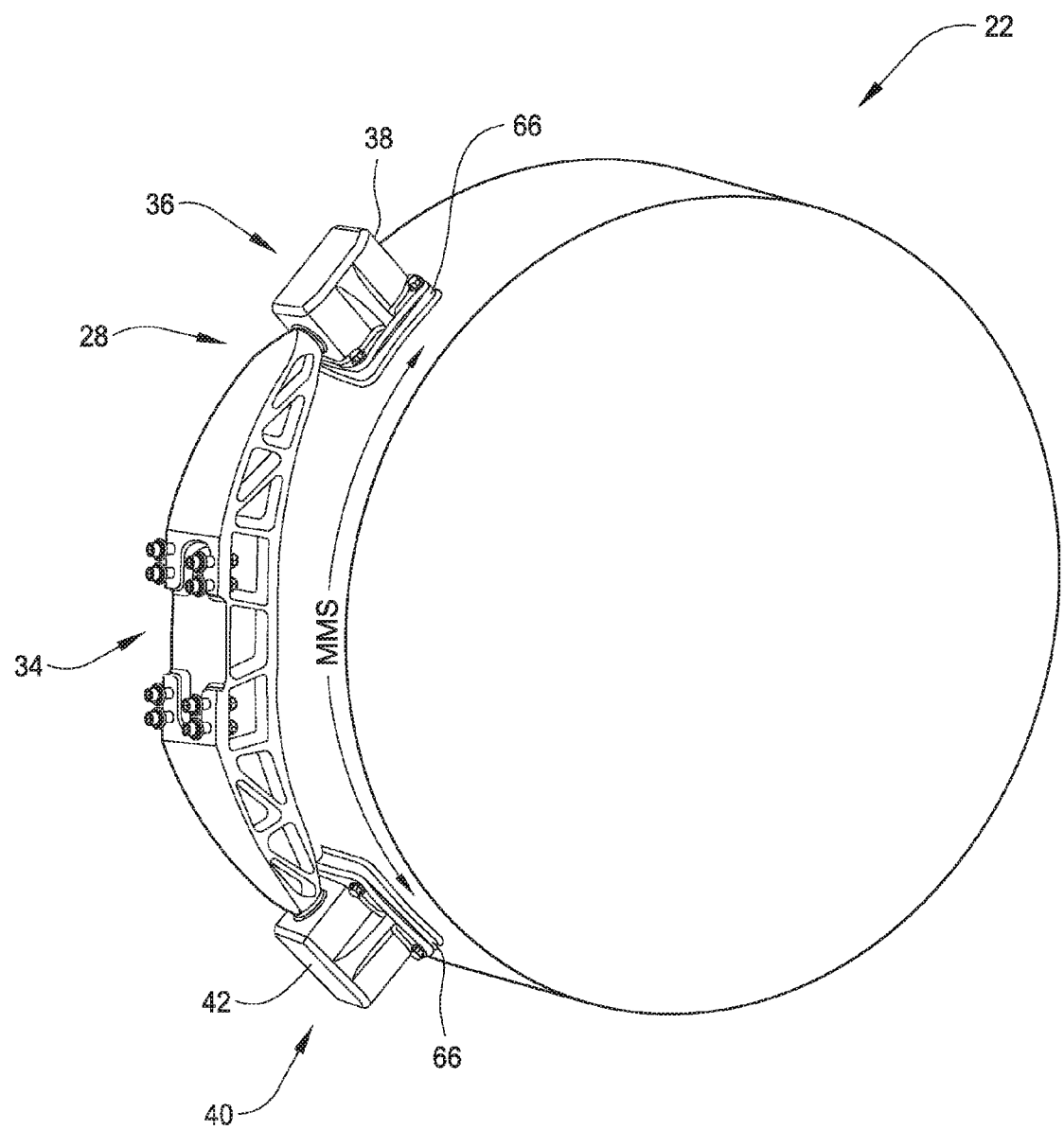
Figure 5:
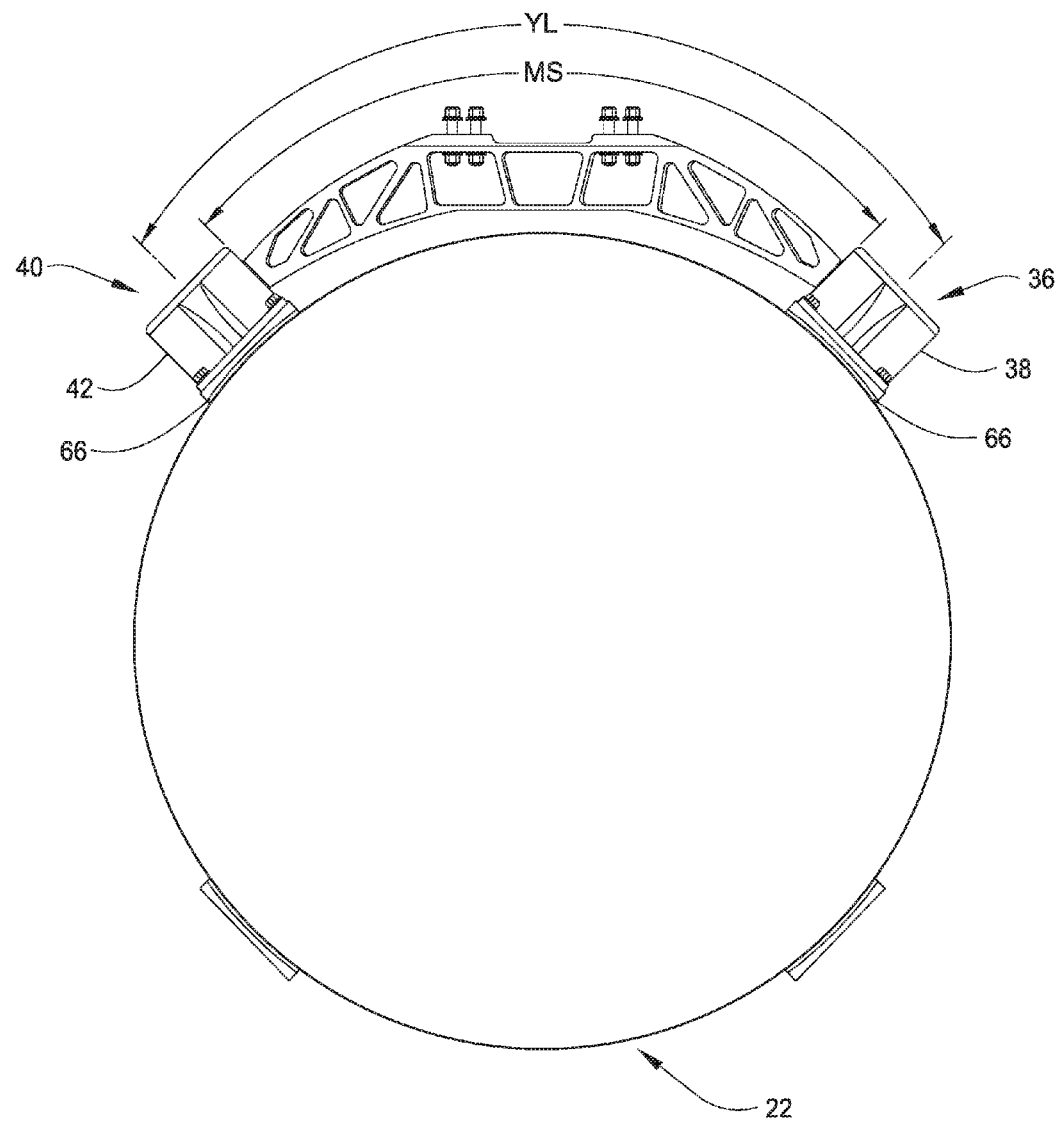
FIGS. 5 and 6 are side views of the engine isolation system.
Figure 6:
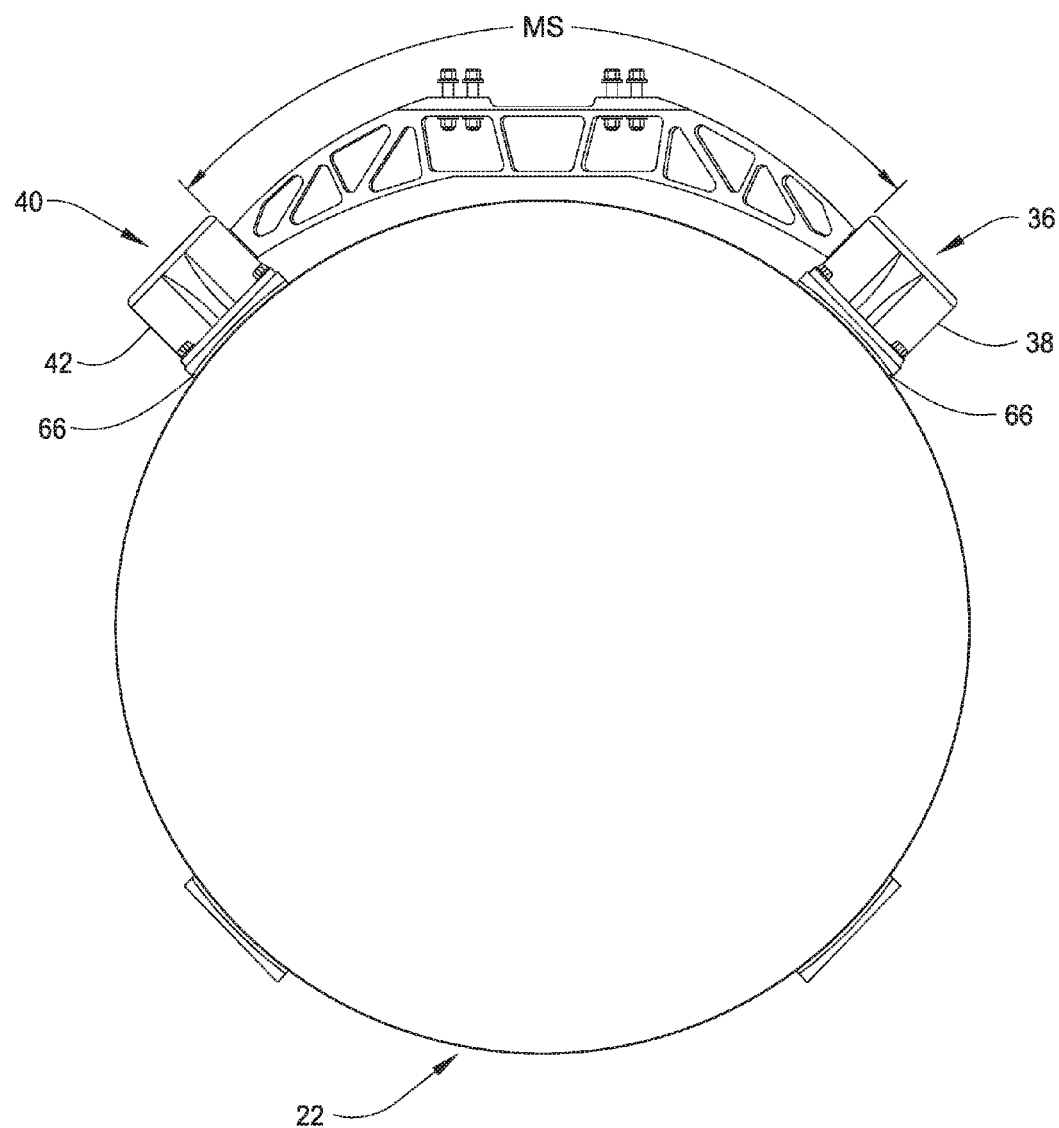
Figure 7:
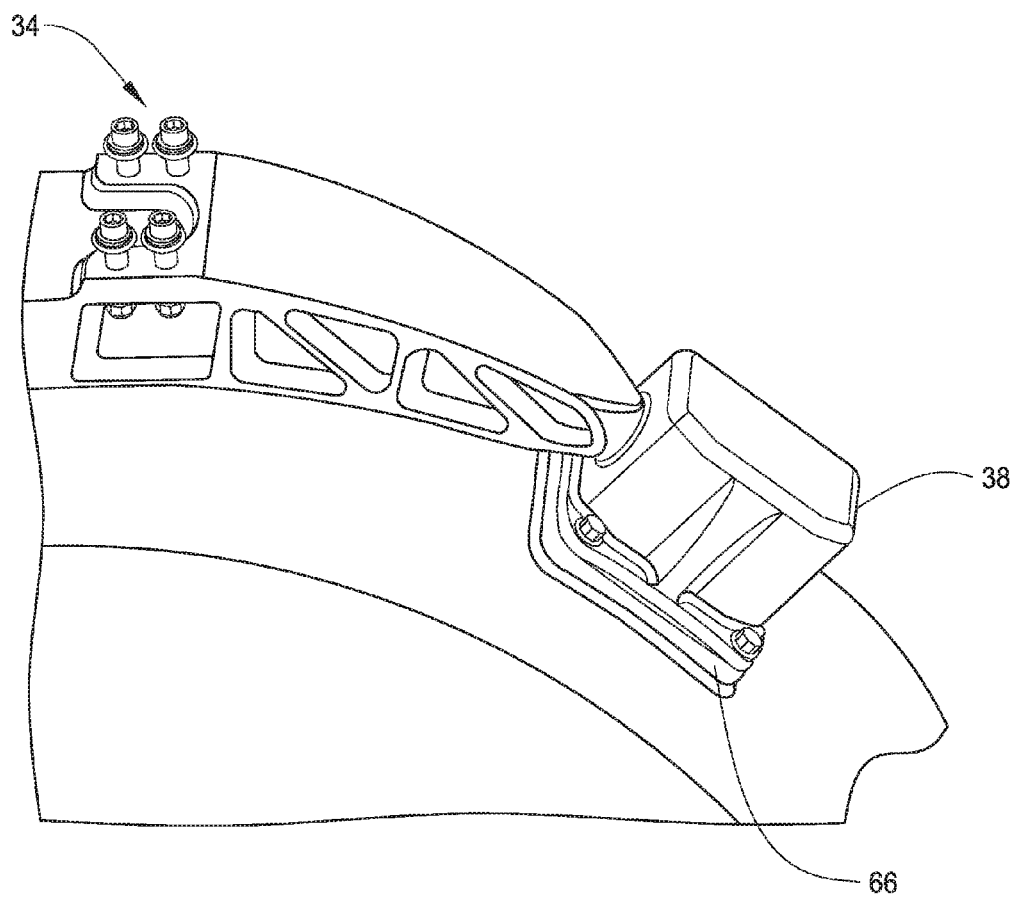
FIG. 7 is a detail view of an engine mount housing.
Figure 8:
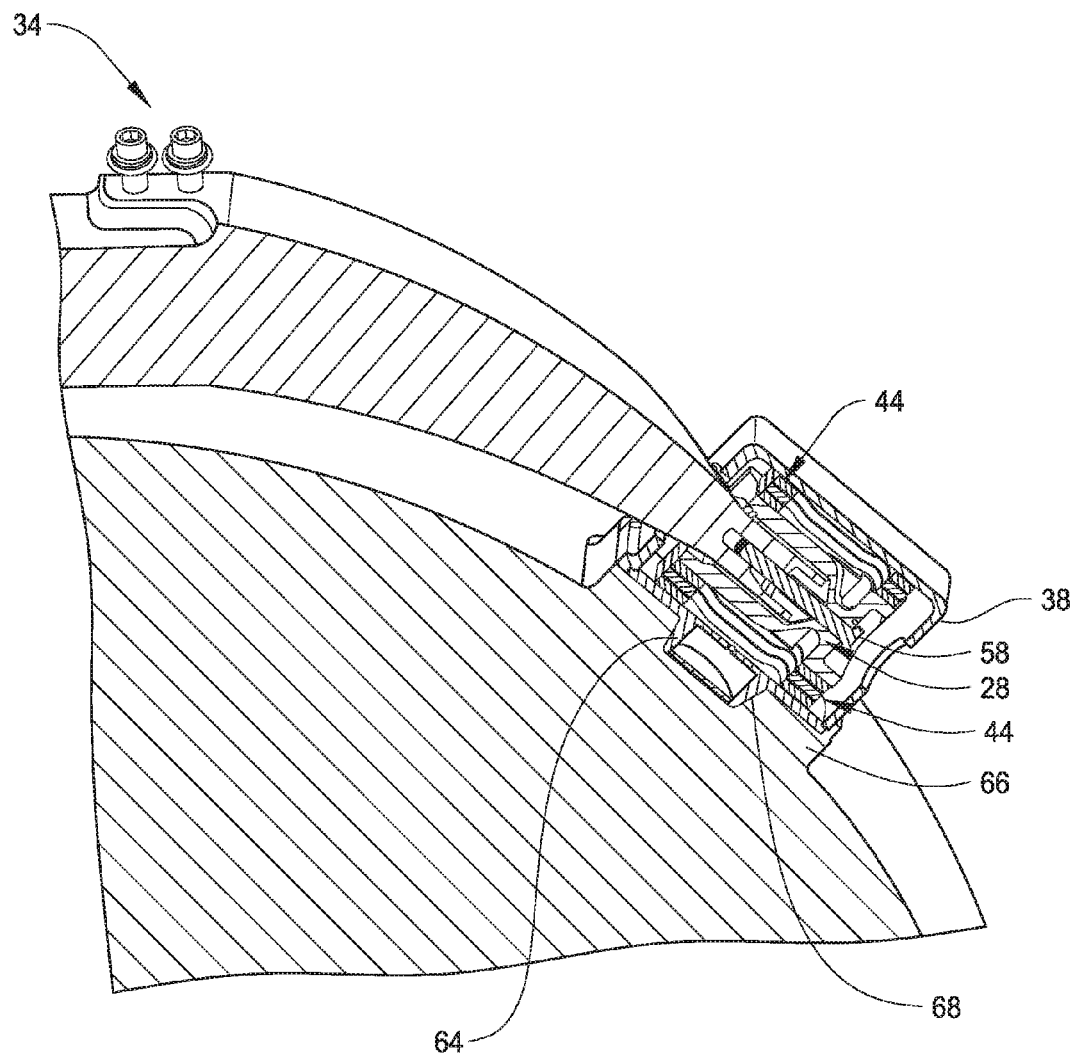
FIGS. 8 and 9 are section views of an engine mount housing.
Figure 13:
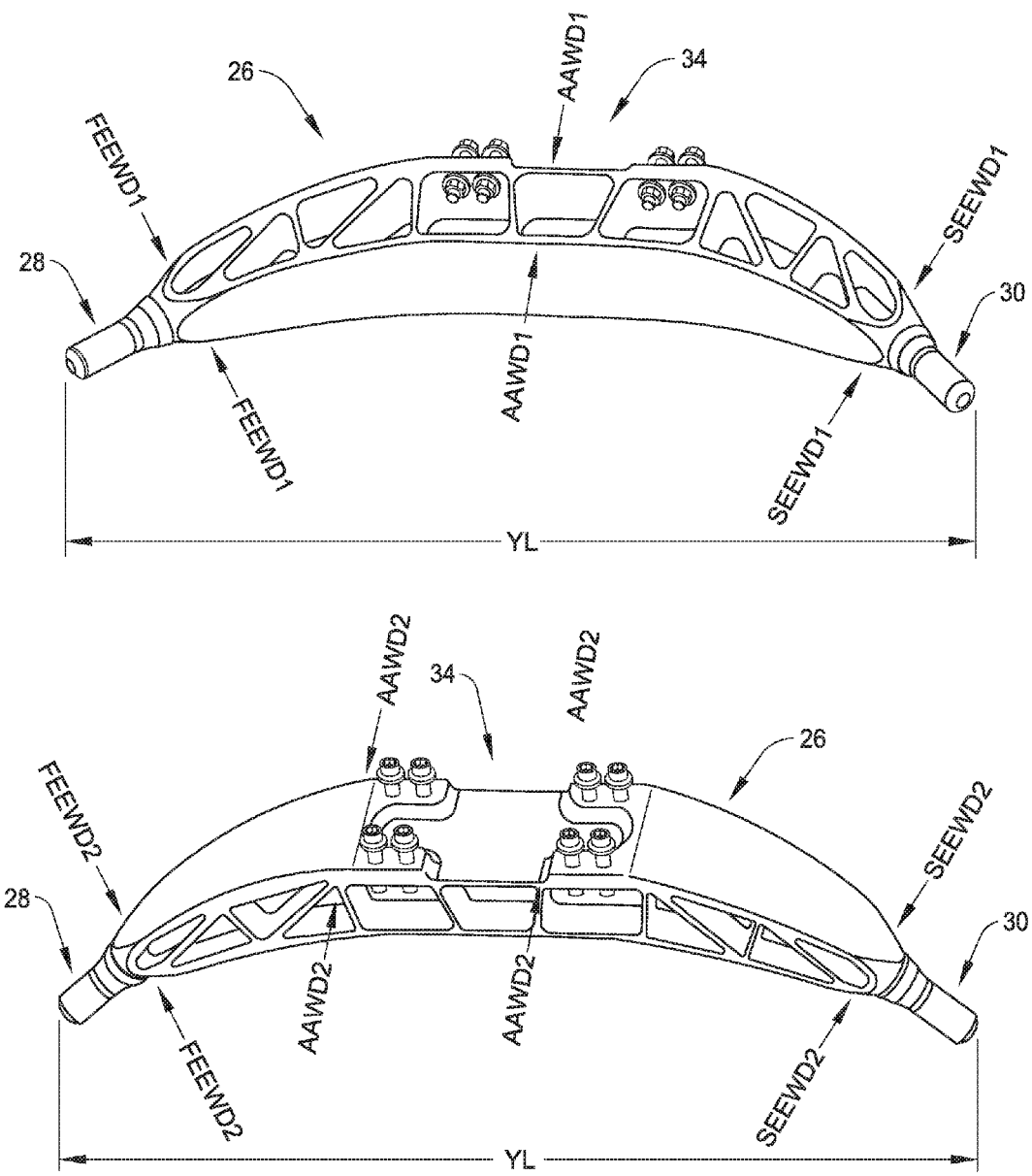
FIG. 13 is top and bottom perspective view of yoke member illustrating yoke member length (YL).
Figure 14:
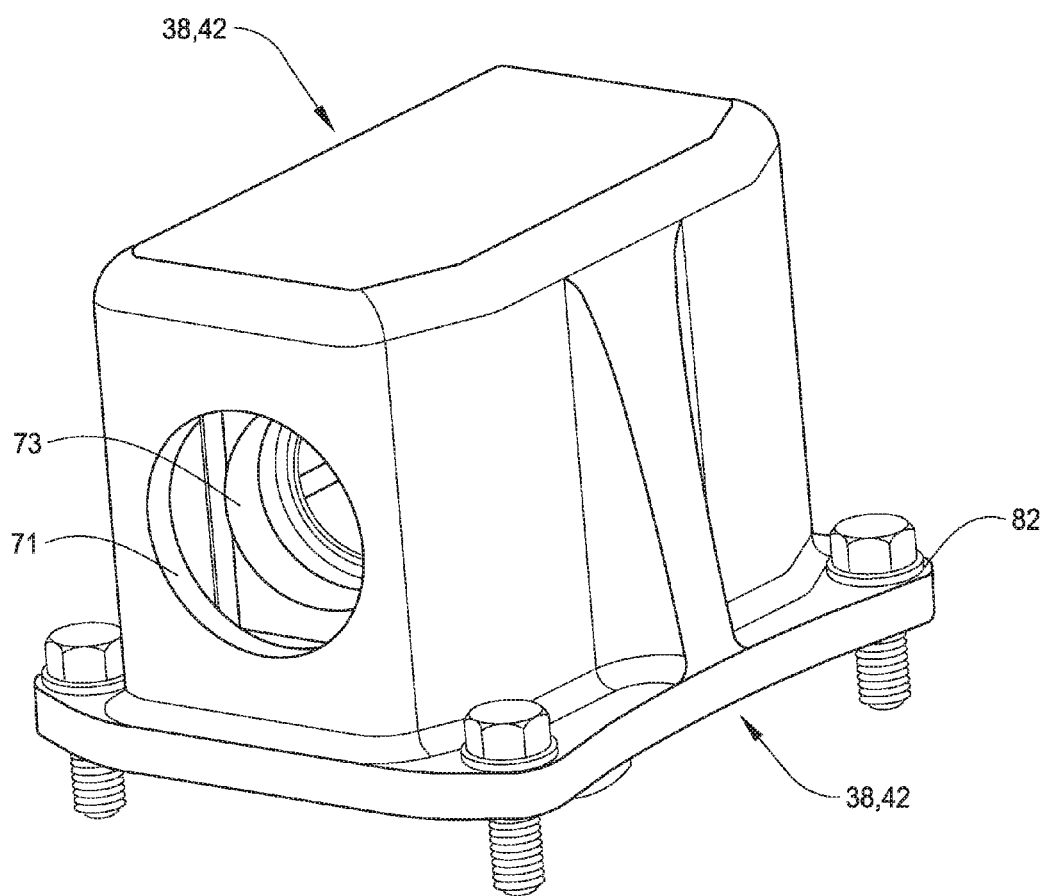
FIG. 14 is a perspective side view of an engine mount housing.
Figure 15:
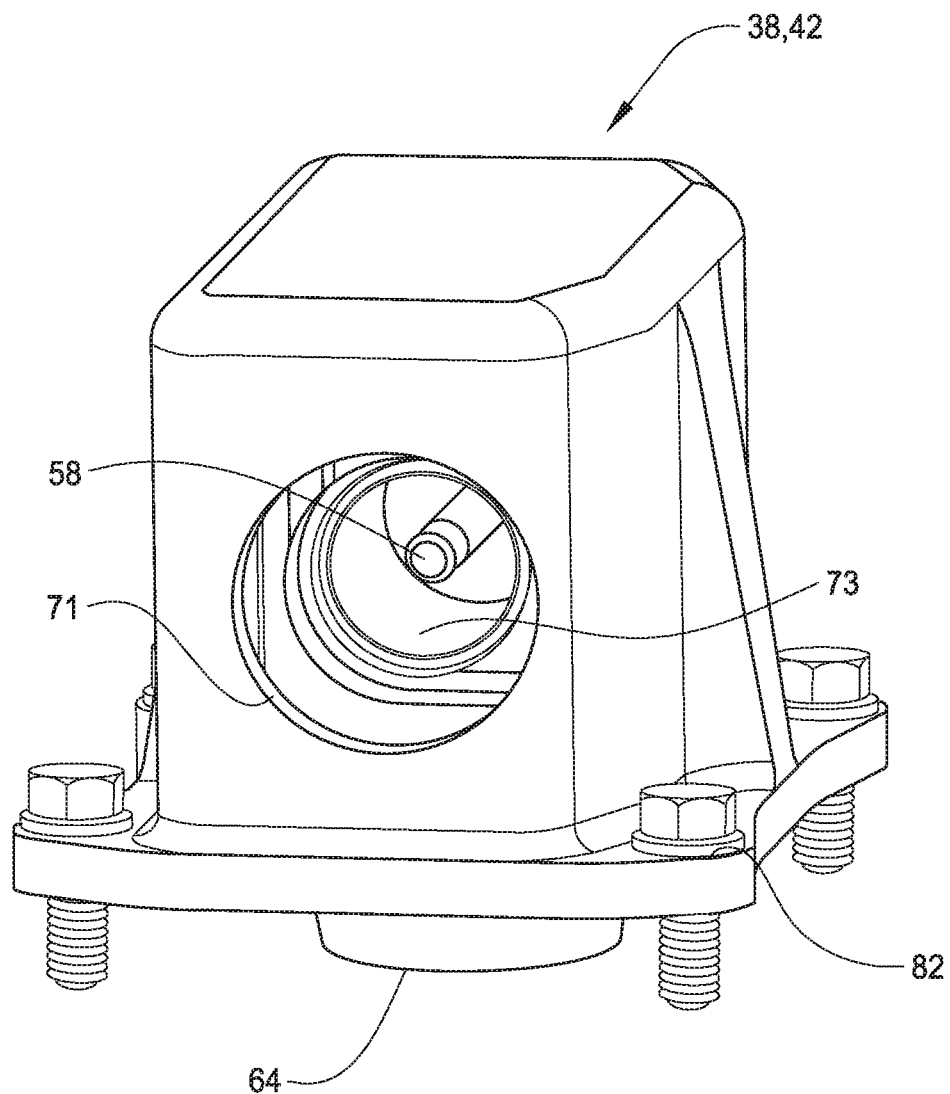
FIG. 15 is perspective end view of an engine mount housing.
Figure 16:
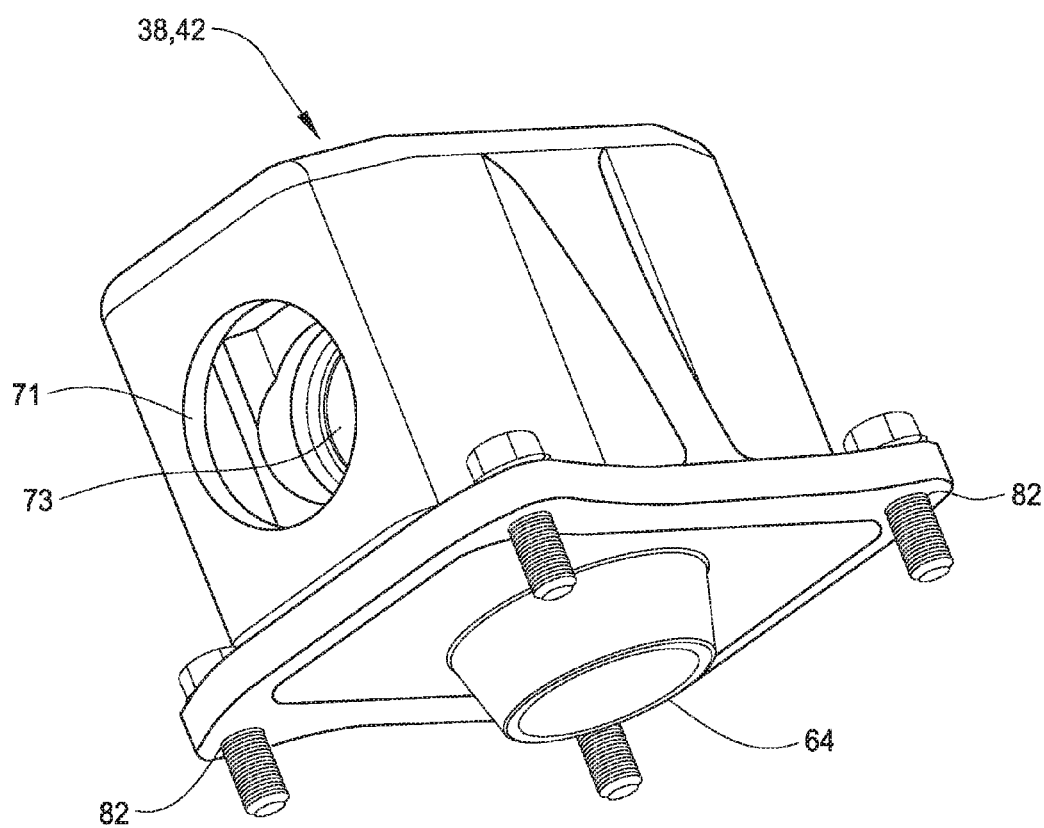
FIG. 16 is a perspective bottom view of an engine mount housing.
Figure 17:
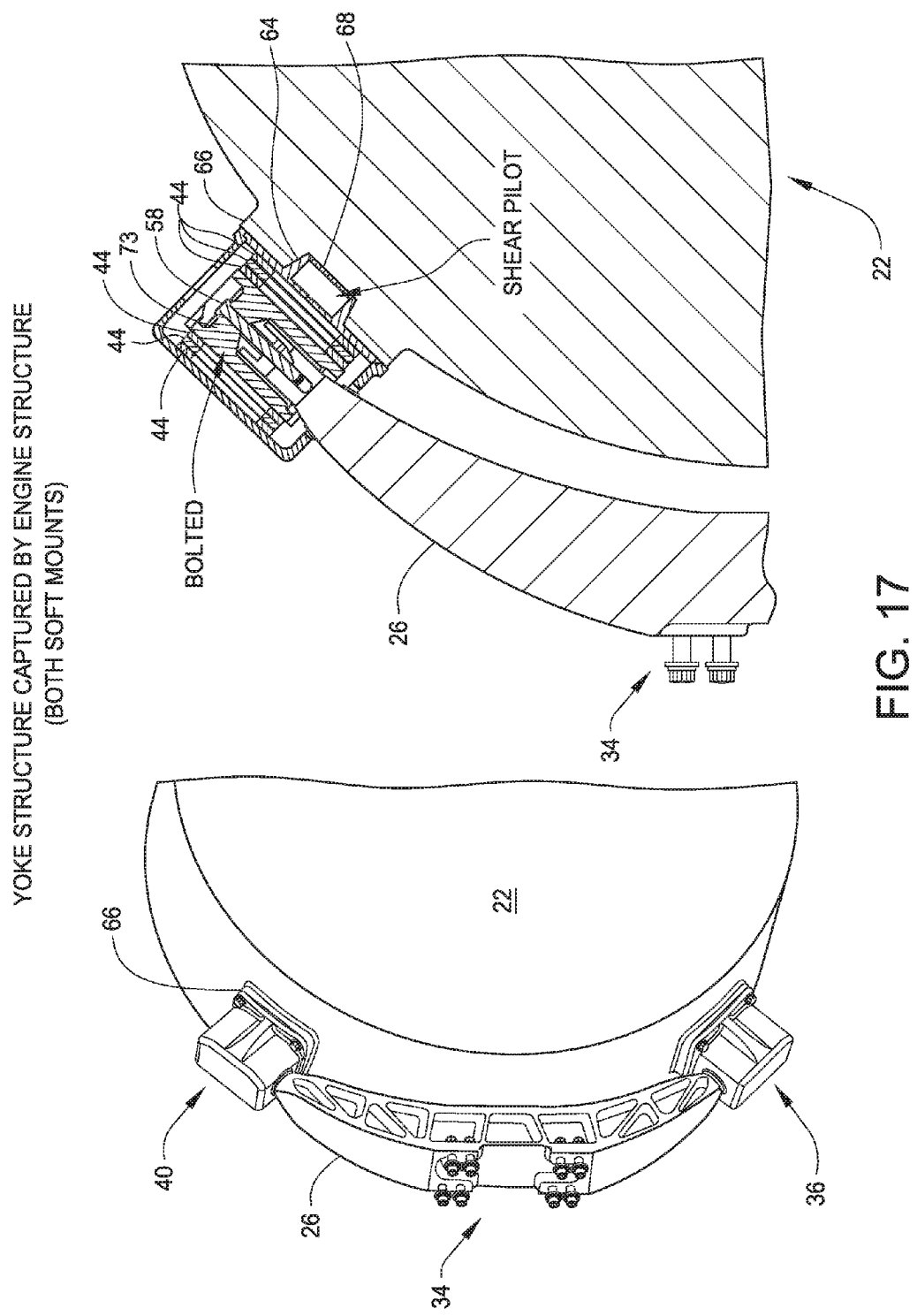
FIG. 17 illustrates the yoke member captured by the engine mounting system using two soft mounts.
Figure 18:
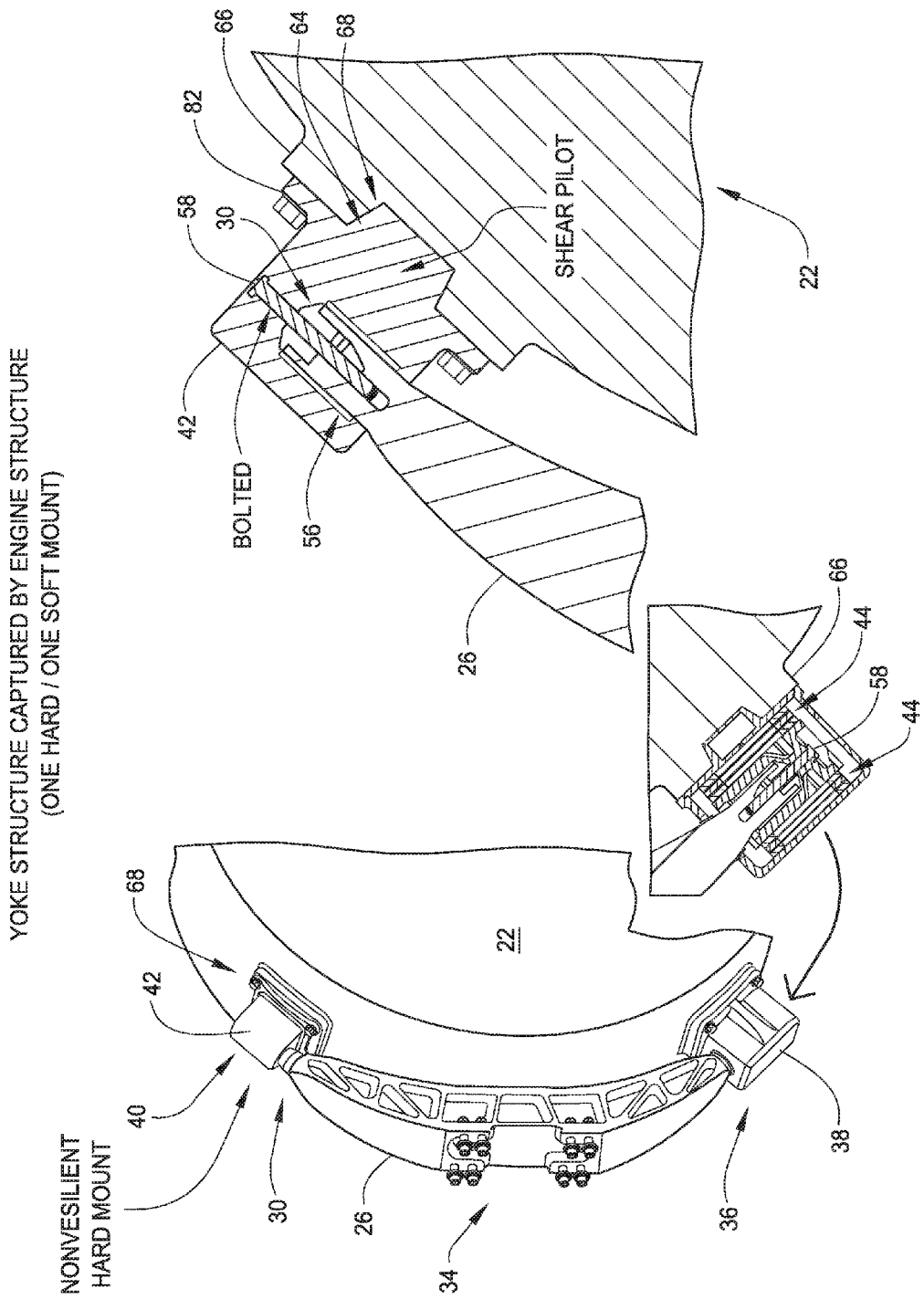
FIG. 18 illustrates the yoke member captured by the engine mounting system using one soft mount and one hard mount.

With reference to FIGS. 3, 4 and 13, aircraft engine mounting system 20 includes yoke member 26 having a first end 28 and a second end 30 separated by distance YL. Yoke member 26 further includes an aircraft attachment point 34. Centrally located on yoke member 26, aircraft attachment point 34 provides a plurality of bolts, studs or other devices suitable for securing yoke member 26 to aircraft 24.

Aircraft engine mounting system 20 also includes a first engine mount 36 and a second engine mount 40. The distance between first engine mount 36 and second engine mount 40 being MS as measured from the edges of engine mounts 36 and 40 adjacent to yoke member 26. See FIG. 5. Referring to FIGS. 4-15, each engine mount 36, 40 carries mounting points 82 configured to permit attachment of each mount 36, 40 to a corresponding mounting mate 66 carried by aircraft engine 22. Securement may be by bolts or studs passing through mounting points 82 into mounting mate 66, as determined by the application. The configuration of the securement of engine mounts 36 and 40 to mounting mates 66 may be achieved in one of several manners as described below. In most embodiments, each mounting mate 66 includes a recess 68 configured to engage an alignment boss 64 carried by each engine mount 36, 40. However, as depicted in the FIGS. recess 68 and boss 64 are optional. MMS is measured from the inner edge of each recess 68. The relative lengths of YL, MS and MIMS are depicted in FIG. 10.

FIG. 13 provides additional detail concerning the configuration of yoke member 26. As depicted in FIG. 13, aircraft attachment point 34 has a width of AAWD. Additionally, the width of yoke member 26 adjacent to first end 28 is FEEWD2 while the width of yoke member 26 adjacent to second end 30 is SEEWD2. In the depicted embodiment, AAWD2 will be greater than FEEWD2 and AAWD2 will be greater than SEEWD2. Likewise AAWD1 will be greater than FEEWD1 and AAWD1 will be greater than SEEWD1 Thus, yoke member 26 tapers in both width and thickness from aircraft attachment 34 to ends 28, 30.

The construction of first and second engine mounts 36, 40 will vary with application. In one embodiment of engine mount system 20 each engine mount 36, 40 is configured to reduce vibrations. For the sake of conciseness, the following description of a twin soft mount configuration references engine mount 36; however, the description also includes the corresponding reference elements for the components associated with engine mount 40 in parentheses after the identifier for the component associated with engine mount 36. For example when referencing end 28 associated with engine mount 36, end 30 will appear as (30) indicating the corresponding element associated with engine mount 40. Engine mount 36 (40) includes an engine mount housing 38 (42). Engine mount housing 38 (42) is secured to aircraft engine 22 via mounting points 82 and mounting mates 66 as described above. In this configuration, the mounting mechanism provides a grounding contact between outer engine mount housing 38 (42) and aircraft engine 22. As described above, alignment boss 64 is carried on the underside portion of each engine mount housing 38 (42). Alignment boss 64 is a shear reacting member. To aid in assembly of engine mount 36 (40) to recess 66 of mounting mate 66, in a preferred configuration alignment boss 64 will have a conical or tapered configuration corresponding to the configuration of recess 66.

FIGS. 8-12 and 14-16 depict a soft mount configuration for engine mount 36 (40). As depicted, engine mount housing 38 (42) has a first opening 71 sized to receive end 28 and a second opening 72 providing access to end 28 (30) when positioned within engine mount housing 38 (42). In the soft mount configuration, engine mounts 36, 40 provide vibrational isolation of aircraft engine 22 from aircraft 24.

Figure 9:
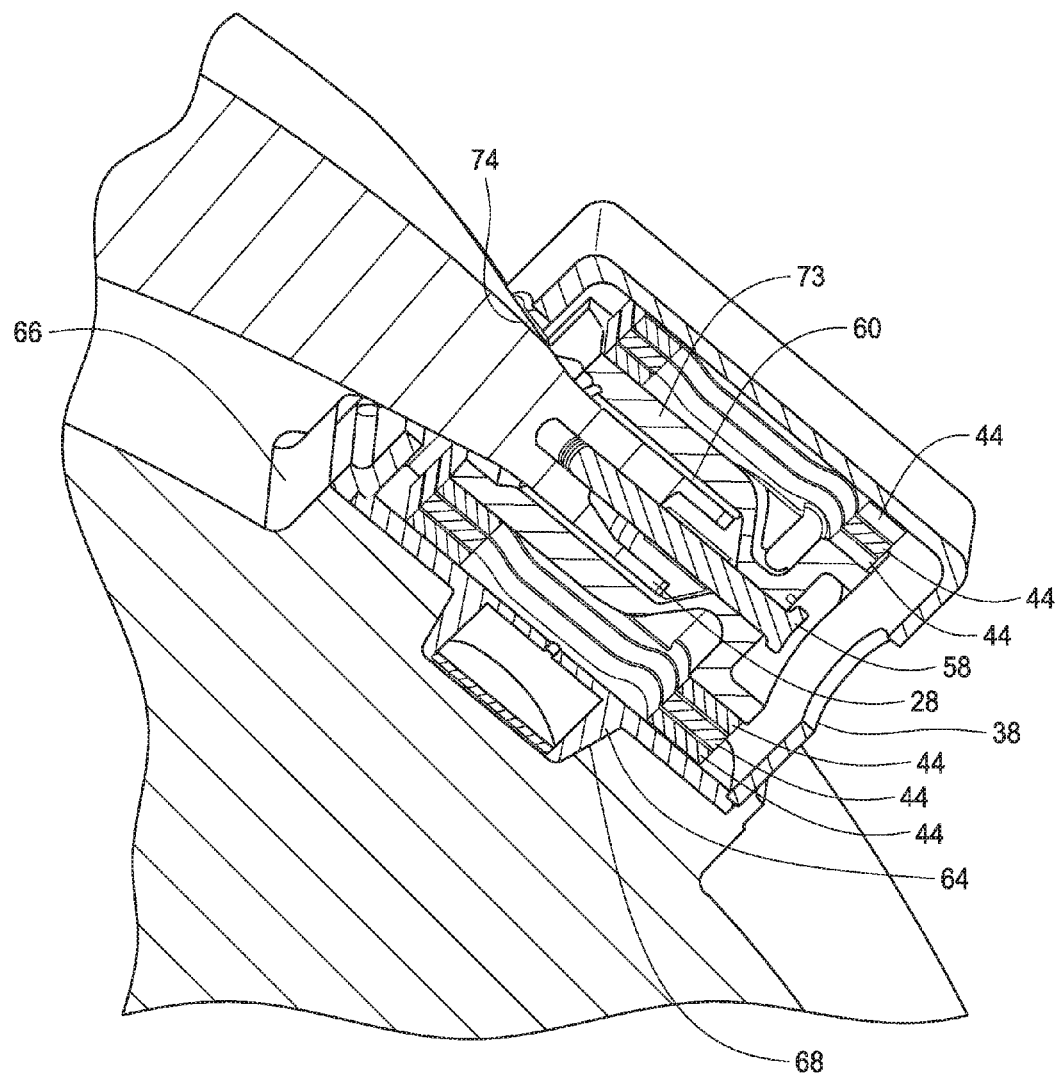
Figure 10:
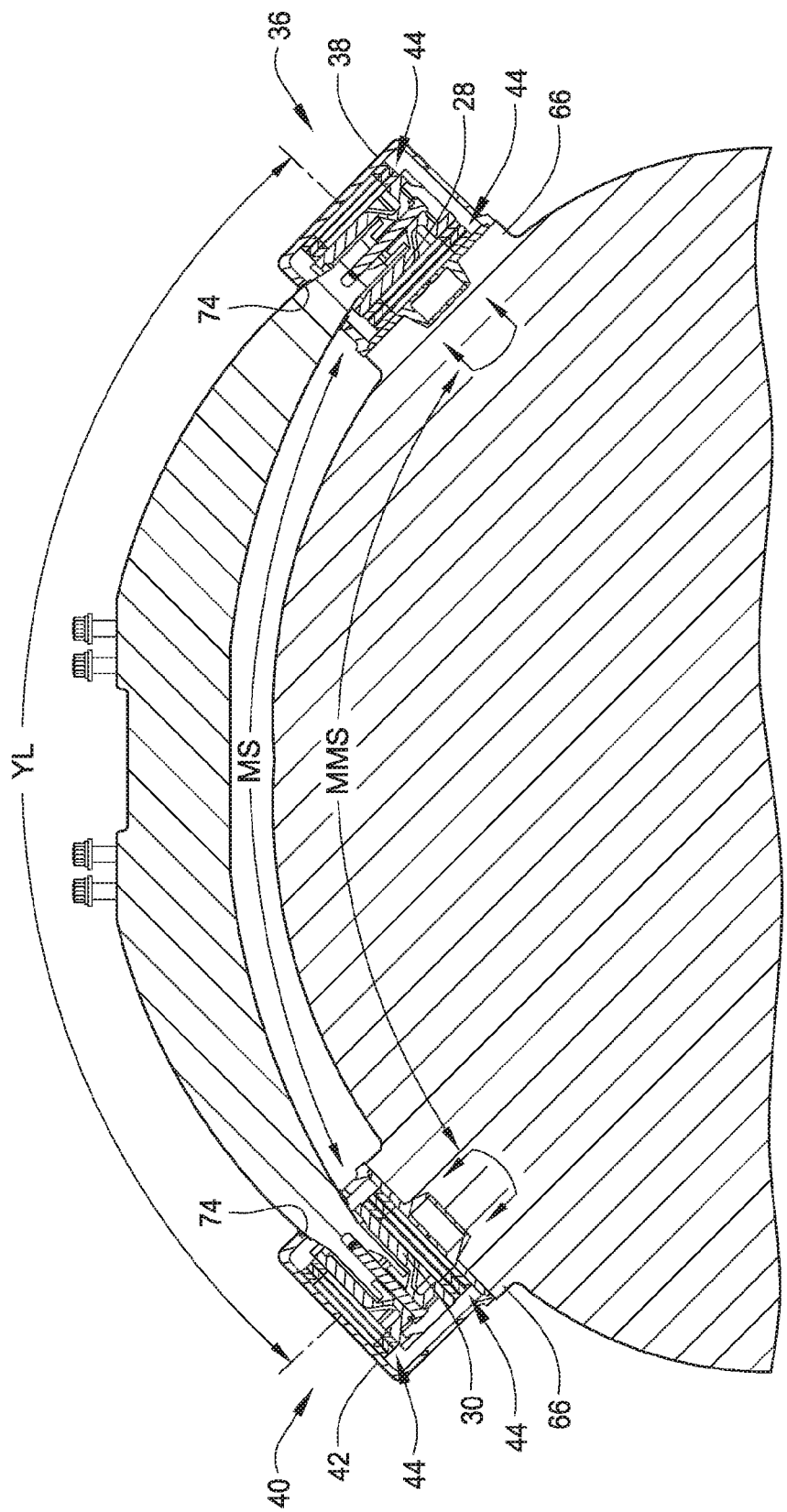
FIG. 10 is a section view of both engine mount housings.

With reference in particular to FIG. 9, engine mount housing 38 received end 28 of yoke member 26 and engine mount housing 42 receives end 30. Located within engine mount housing 38 (42) is a vibration damping component 44, e.g. a bonded isolating elastomer or flexible isolator element. In one embodiment, vibration damping component 44 is at least one elastomeric material suitable for providing vibrational isolation e.g. a flexible elastomer suitable for damping engine vibrations. Optionally, elastomeric material 44 may comprise a plurality of layers or components. See for example FIG. 12. Additionally, damping component may optionally include a fluid component to reduce transmitted force within engine mount housing 38 (42).

Centrally located within damping component 44 is an inner member 73 configured to receive end 28 (30) of yoke member 26. The inside dimensions of inner member 73 permit a sliding relationship between cylinder 73 and end 28 (30). As depicted, inner member 73 is a cylinder having an inside diameter sufficient to permit a sliding relationship between cylinder 73 and end 28 (30). Thus, end 28 (30) extends a distance into engine mount housing 38 (42). As will be described in more detail below, an optional fastener 58, referred to herein as bolt 58, may be inserted into threaded hole 78 within end 28 (30) to secure yoke member 26 to engine mount 36 (40). Optionally, a optional washer 59 may be used with bolt 58. Second opening 72 in engine mount housing 38 (42) provides access to end 28 (30) for optional bolt 58 and necessary tools to secure bolt 58 to yoke member 26.

Figure 11:
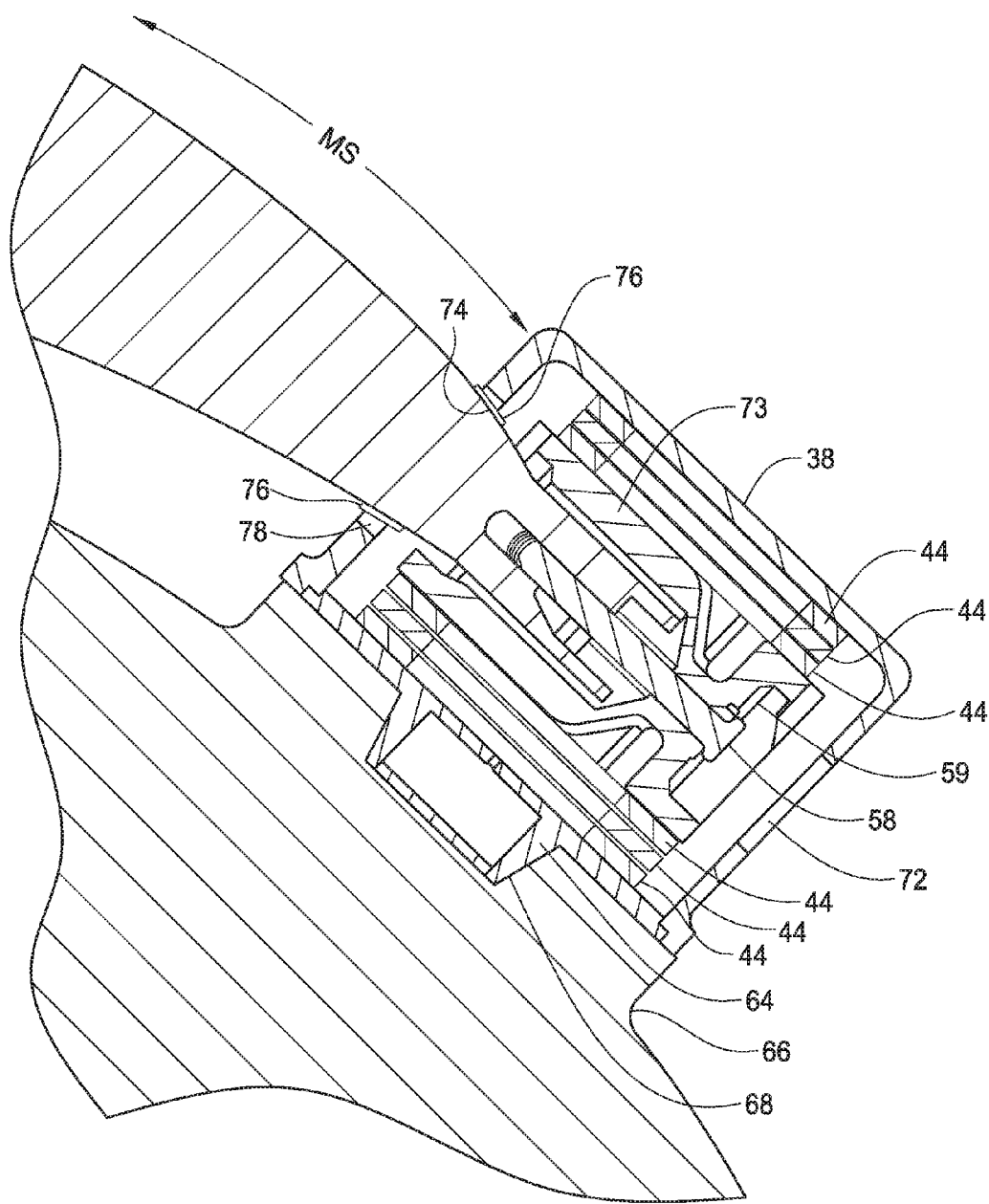
FIG. 11 is a section view of an engine mount with a mounting mate.
Figure 12:
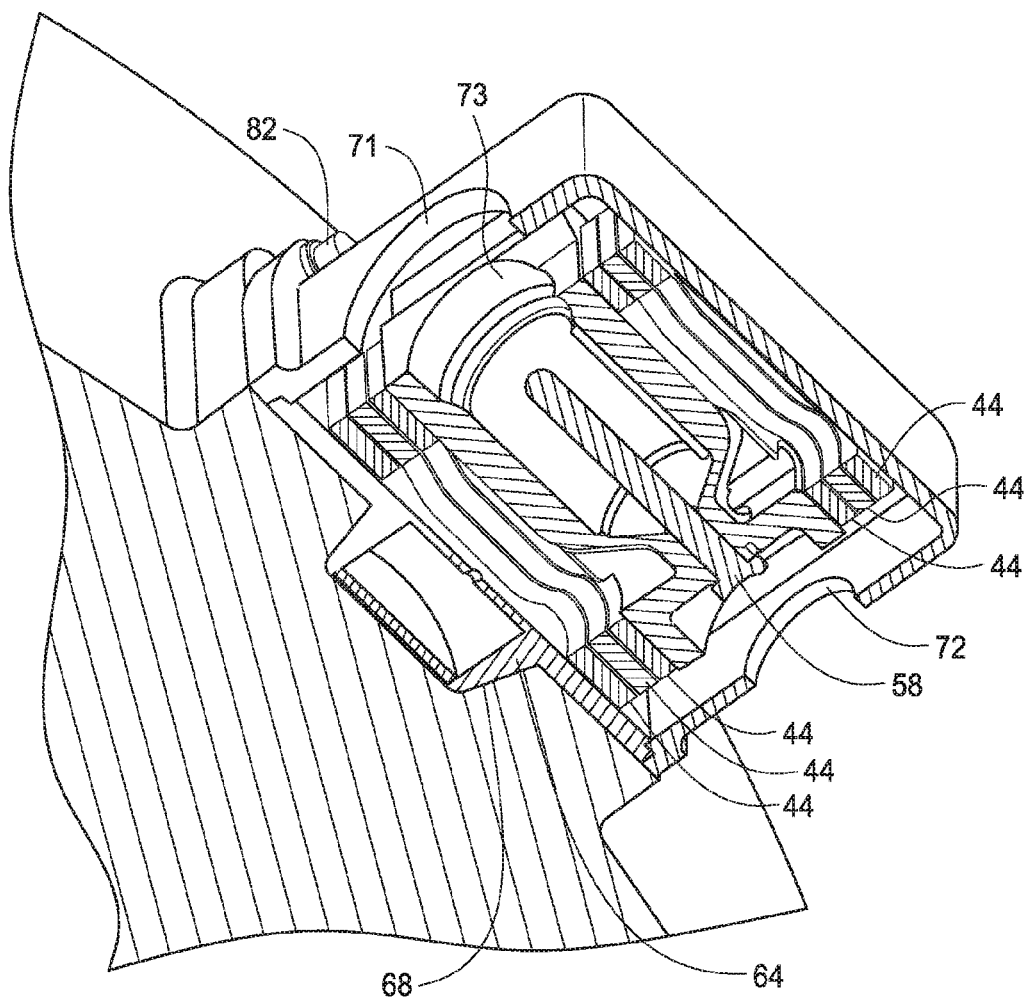
FIG. 12 is a section view of engine mount housing with a mounting mate and volume compensator.

Opening 71 provides a snubbing arrangement between yoke member 26 and engine mount 36 (40). The snubbing arrangement provides a failsafe configuration which eliminates the need for redundant securement mechanisms between yoke member 26 and aircraft engine 22. As depicted in FIG. 11, opening 71 includes a snubbing gap 78. In one embodiment, snubbing gap is filled by a sacrificial snubbing sleeve 76. Snubbing sleeve 76 is sized to permit sliding motion of end 28 (30) at location 74 through opening 71. Thus, snubbing sleeve 76 acts as a bushing between end 28 (30) and opening 71 of engine mount housing 38 (42).

Under circumstances of high stress or failure of damping component 44, end 28 (30) of yoke member 26 will be retained by a snubbing action within engine mount housing 38 (42). The snubbing action does not depend upon the presence of bolt 58. Thus, bolt 58 is not required in each engine mount 36, 40. As described below use of bolt 58 will depend upon the final configuration of engine mounting system 20. Accordingly, when fully assembled, the configuration of end 28 (30) positioned within engine mount housing 38 (42) provides an interlocking relationship between the metal components of engine mounting system 20 which ensures retention of aircraft engine 22 to aircraft 24 without the need for redundant securement systems.

Figure 28:
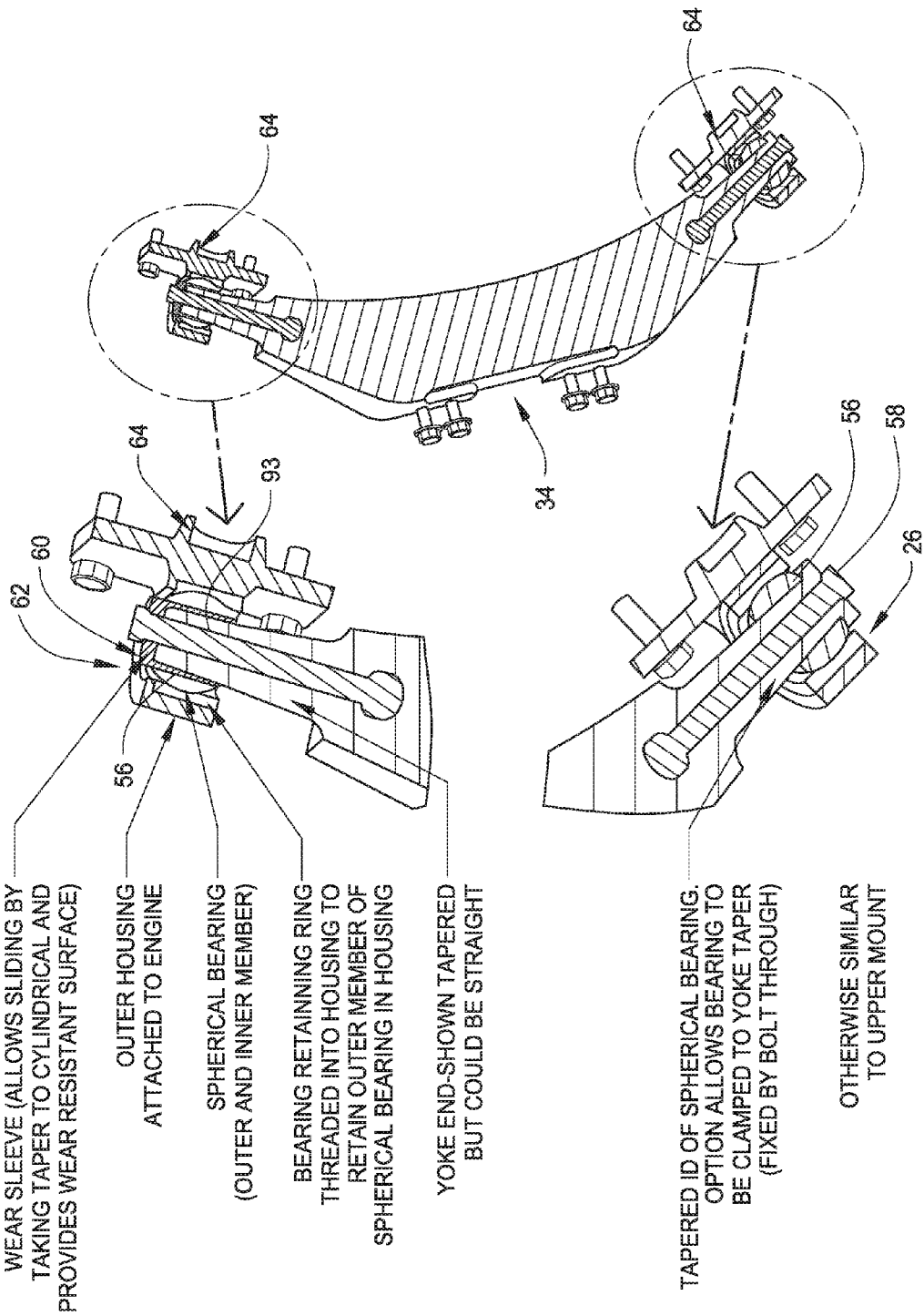
FIG. 28 illustrates a sectional view of the alternative embodiment of FIG. 27.
Figure 29:
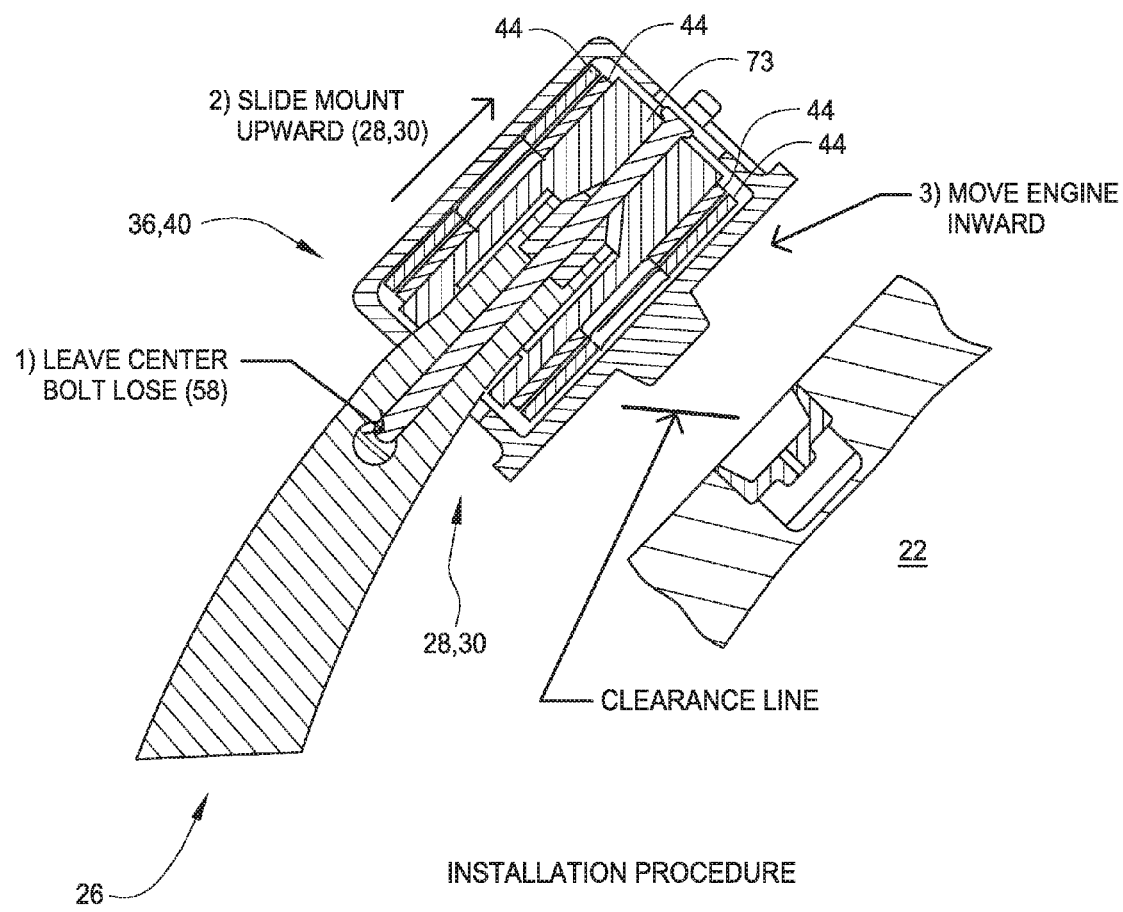
FIG. 29 illustrates an installation procedure.
Figure 30:
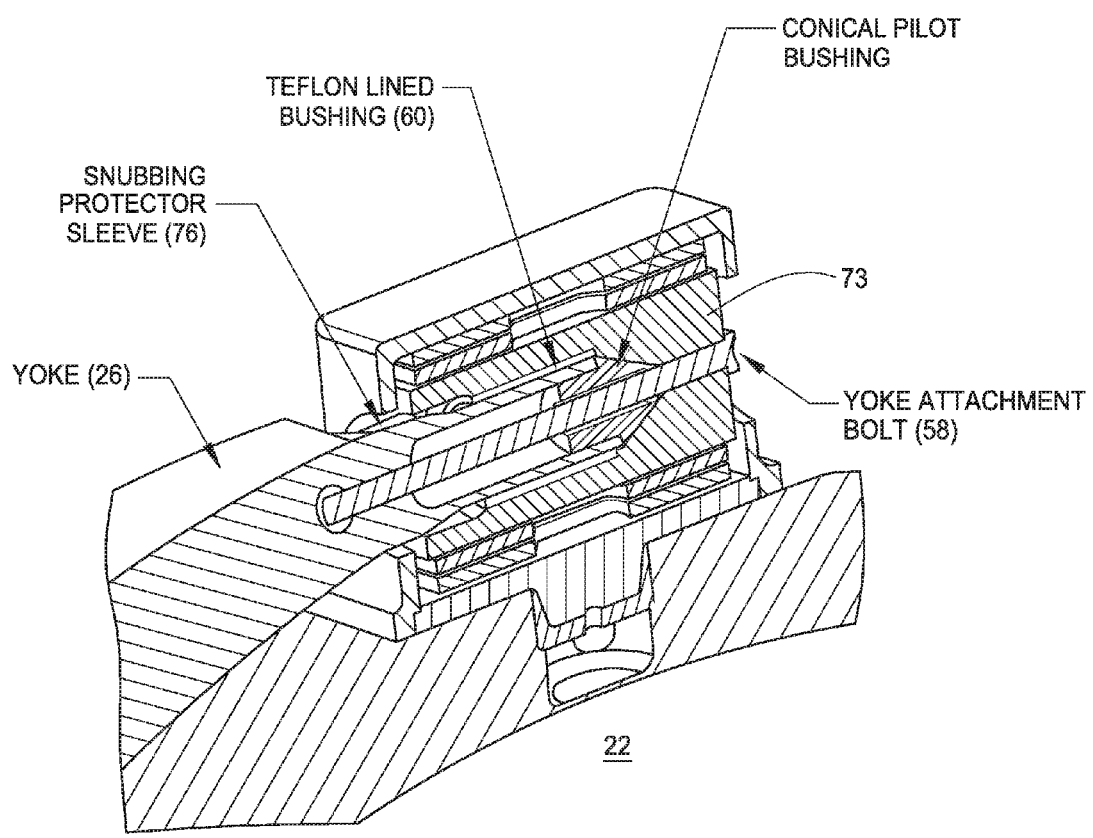
FIG. 30 illustrates fitting the yoke into the mount.

In an alternate embodiment of engine mounting system 20, engine mounts 36, 40 have a hard mount configuration. FIGS. 18, 19, 21, 22, 24, 25, 27-29 depict a hard mount configuration for engine mounts 36, 40. With reference to FIG. 28, in one embodiment the hard mount configuration positions a nonresilient nonextensible intervening material element 56, referred to herein as spherical bearing 56, within housing 38 (42). Spherical bearing 56 has a central opening sized to receive end 28 (30) of yoke member 26. Preferably, spherical bearing 56 will not react moment into aircraft engine 22. Thus, in one embodiment spherical bearing 56 eliminates moment load at the interface between ends 28, 30 and mounting mate 66. Additionally, ends 28, 30 have a conical taper to permit interlocking of ends 28, 30 with spherical bearing 56 and incorporation of at least one tapered bushing 60 over each end 28, 30 within spherical bearing 56.

One or more bushings or sleeves 60, 62 may be used to permit sliding movement of end 28 (30) through spherical bearing 56. When using two bushings 60, 62, a first bushing 60 will be placed over end 28 (30) and a second bushing 62 placed over first bushing 60. When used together, first bushing 60 is slidable a sliding distance relative to second bushing 62. Bushing 60 and end 28 (30) may be retained within spherical bearing 56 by bolt 58 and optional washer 59. In this embodiment, the presence of bolt 58 rigidly secures yoke member 26 within engine mount 36 (40); however, the absence of bolt 58 permits sliding movement of end 28 (30) within engine mount housing 38 (42) while providing a secure connection between component. Finally, in contrast to the soft mount configuration, the hard mount configuration does not require a snubbing gap FIG. 28 provides an alternative embodiment based on the hard mount configuration. As depicted in FIG. 28, engine mount housings 38, 42 have a single opening configured to receive ends 28, 30 respectively. In this configuration, bolt 58 is not utilized on either engine mount. Rather, each engine mount 36, 40 slidably engages ends 28, 30. Upon securement of aircraft engine 20 to yoke member 26, by bolting each engine mount housing 38, 42 to mounting mates 66, the relationship of MS to YL ensures that yoke member 26 is captured and retained within each engine mount 36, 40.

The interlocking relationship of yoke member 26 to engine mounts 36, 40 depends upon the correct selection of lengths YL and MS. To ensure adequate engagement of each engine mount housing 38, 42 by each end 28, 30, MS must be less than YL. A typical ratio of MS to YL will provide an MS that is less than or equal to 0.85YL. However, the ratio of MS to YL may range from 1:0.86 to 1:0.96. In other words, distance MS will be no more than 96% of the distance YL. More typically, distance MS will be about 85% or less than the distance YL.

Thus, when fully assembled, engine mounting system 20 as described herein provides an interlocking configuration between yoke member 26 and engine mounts 36, 40. As a result, engine mounting system 20 obviates the need for redundant hardware. In the configuration described herein, each engine mount housing 36, 42 is a single load path structure. Engine loads transfer from aircraft engine 22 to mounting points 82 of engine housing 38, 42 and mounting mates 66. Load subsequently passes to resilient member 44 and then to ends 28, 30 of yoke member 26. Yoke member 26 then carries the load to aircraft attachment 34 and aircraft 24. Using yoke member end 28 as an example, the loss of fastener 58 or even the catastrophic failure of resilient member 44 will not result in separation of yoke member end 28 from engine mount housing 38. As discussed above, in each embodiment disclosed herein, the relationship of MS to YL ensures that each engine mount housing 38, 42 has an interlocking relationship with each end 28, 30 of yoke member 26. Thus, if all internal components of one or both engine mount housings 38, 42 fail, engine mount housings 38, 42 will engage associated ends 28, 30 of yoke member 26 in an interlocking relationship to ensure the continued attachment of aircraft engine 22 to aircraft 24. Thus, loss of fastener 58, failure of spherical bearing 56 or failure of resilient member 44 does not adversely affect load distribution into and through yoke member 26. In the hard mount configuration, engagement of ends 28, 30 with engine mount housings 38, 42 results from the direct contact of components as assembled. In the soft mount configuration, engagement of ends 28, 30 with engine mount housings 38, 42 results from closing of snubbing gap 78 and subsequent engagement of ends 28, 30 with engine mounts 48, 42.

Figure 31:
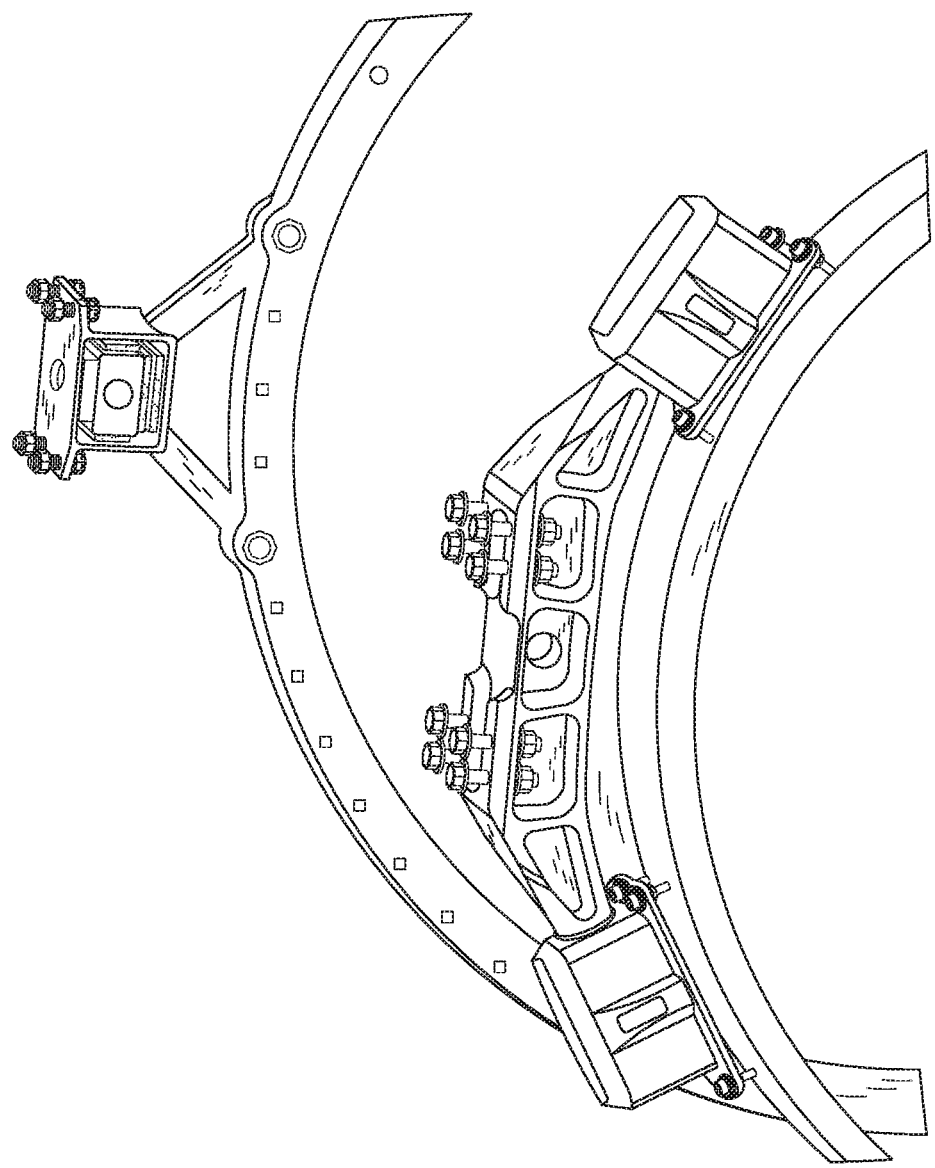
FIG. 31 illustrates the aft engine mount and forward yoke.
Figure 32:
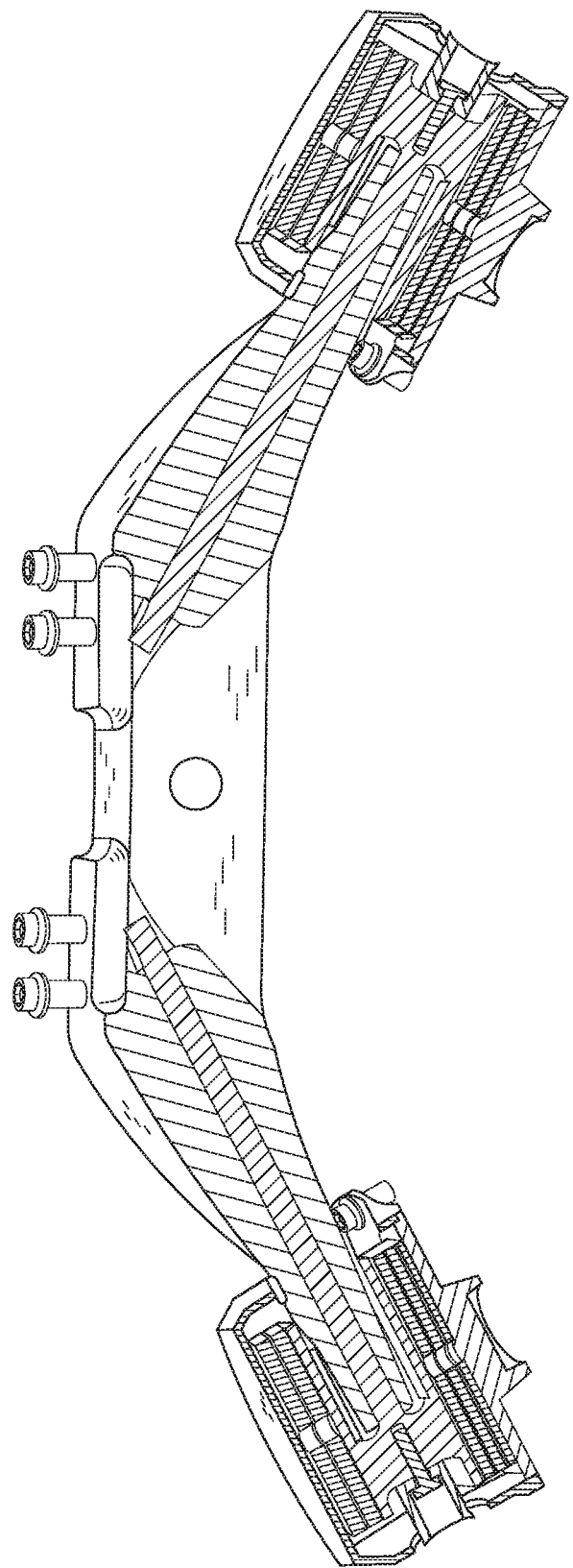
FIG. 32 illustrates the forward mount yoke with arm bolts and fastened engine mounts.
Figure 33:
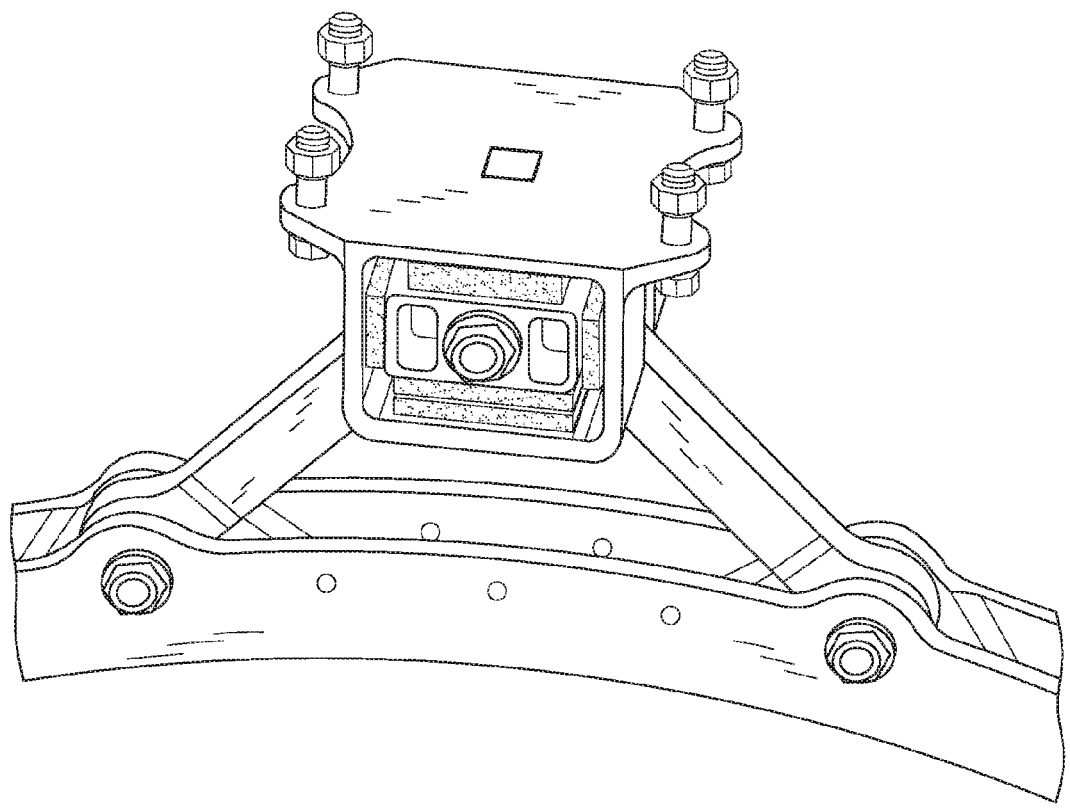
FIG. 33 illustrates the aft engine mount with a link assembly having two link arms grounded to the engine ring.
Figure 34:
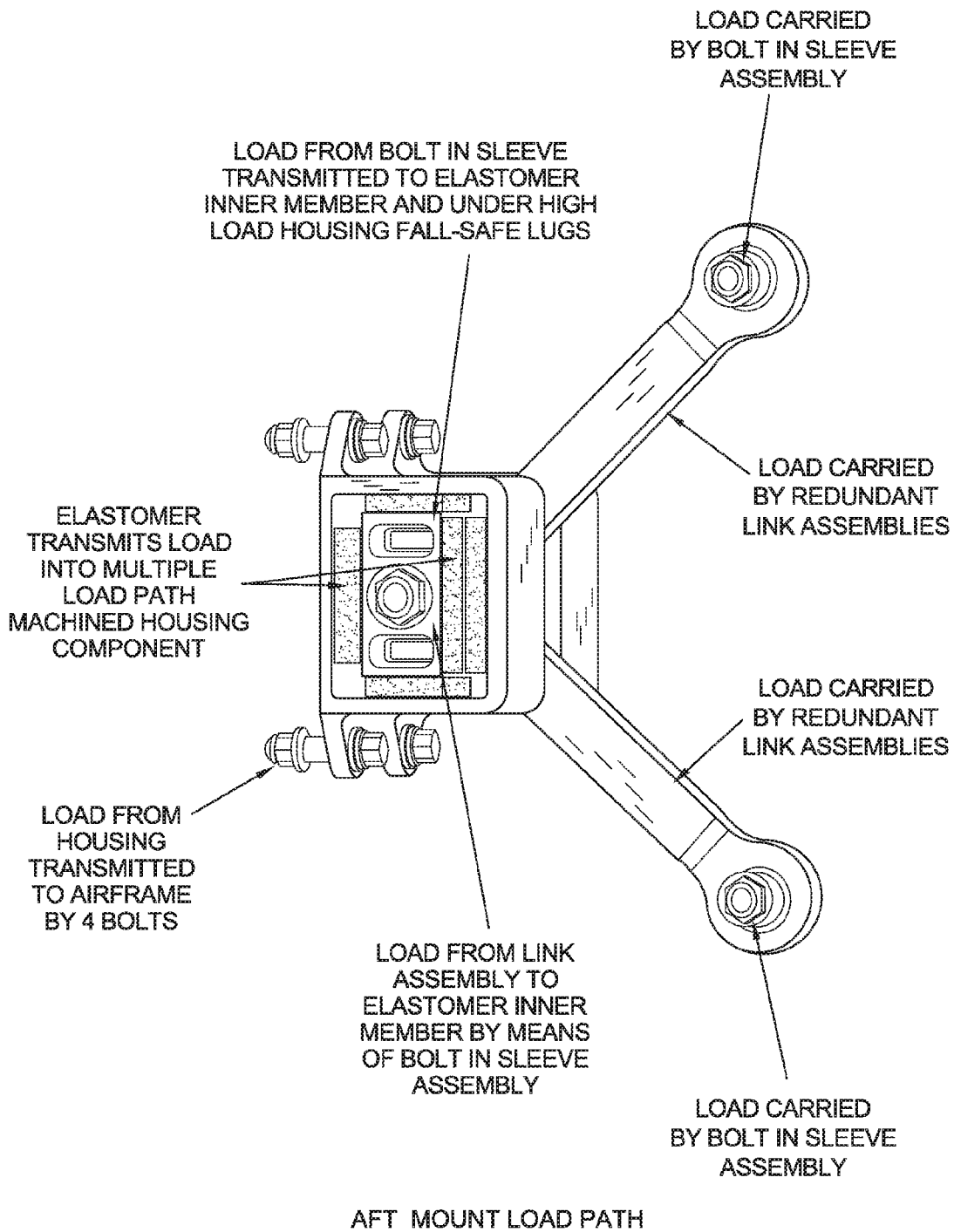
FIG. 34 illustrates the aft engine mount load path.
Figure 35:
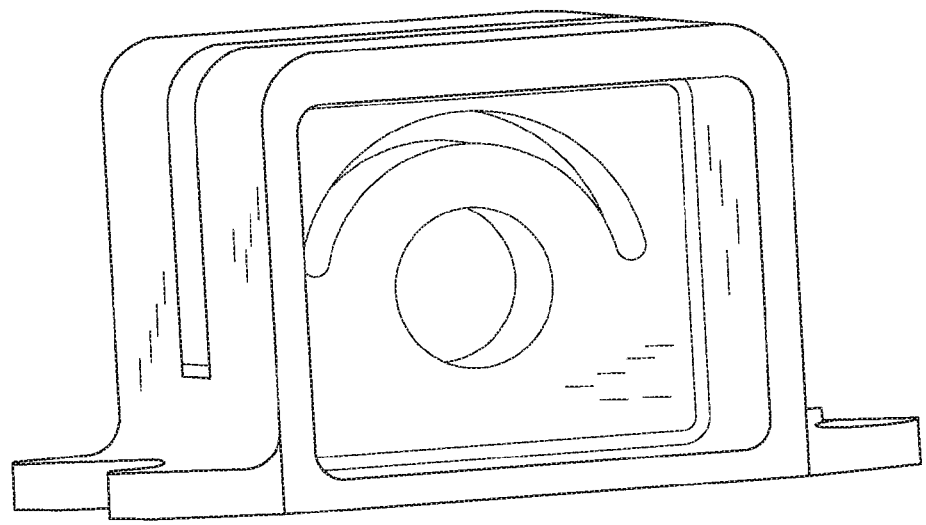
FIG. 35 illustrates a perspective view of the aft housing third aft engine mount airframe structure housing member.
Figure 37:
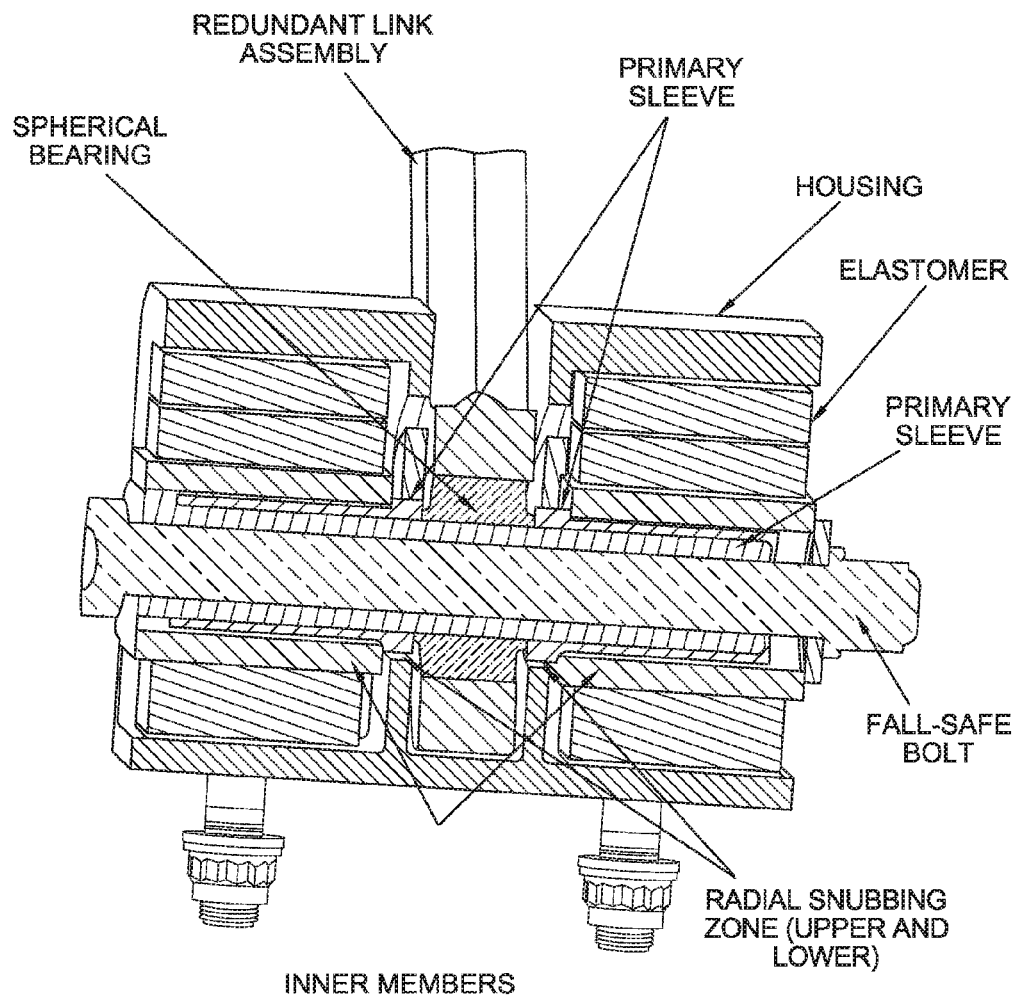
FIG. 37 illustrates a sectional view of the aft mount link to isolator with a failsafe bolt-in-sleeve.
Figure 38:
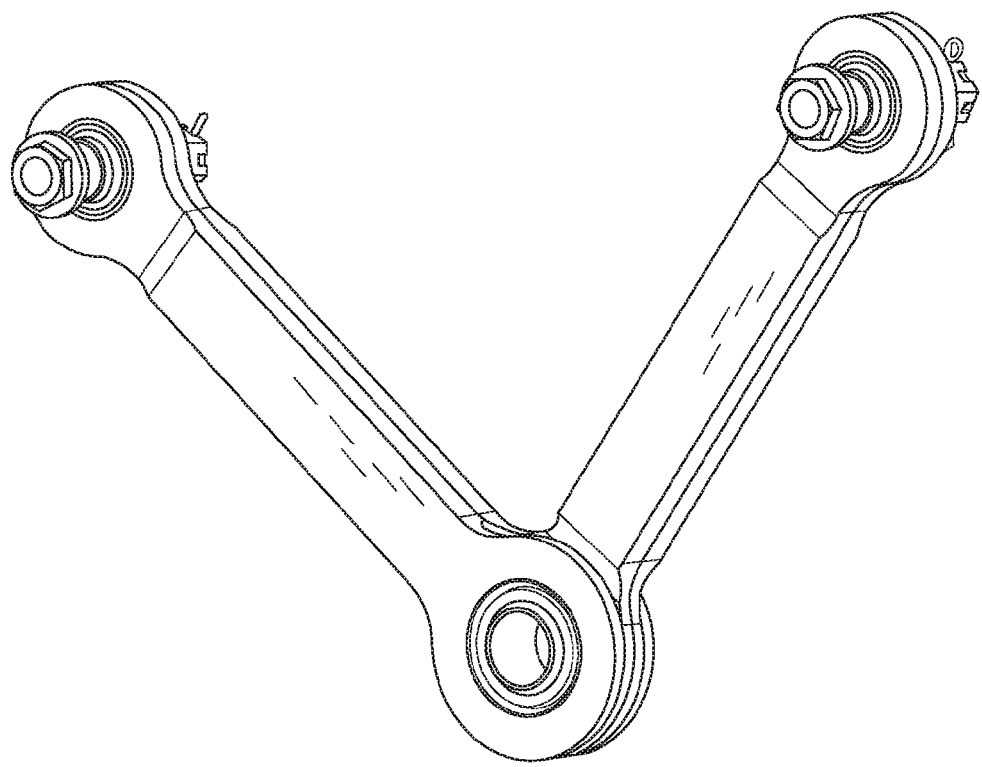
FIG. 38 illustrates an aft mount link assembly.
Figure 39:
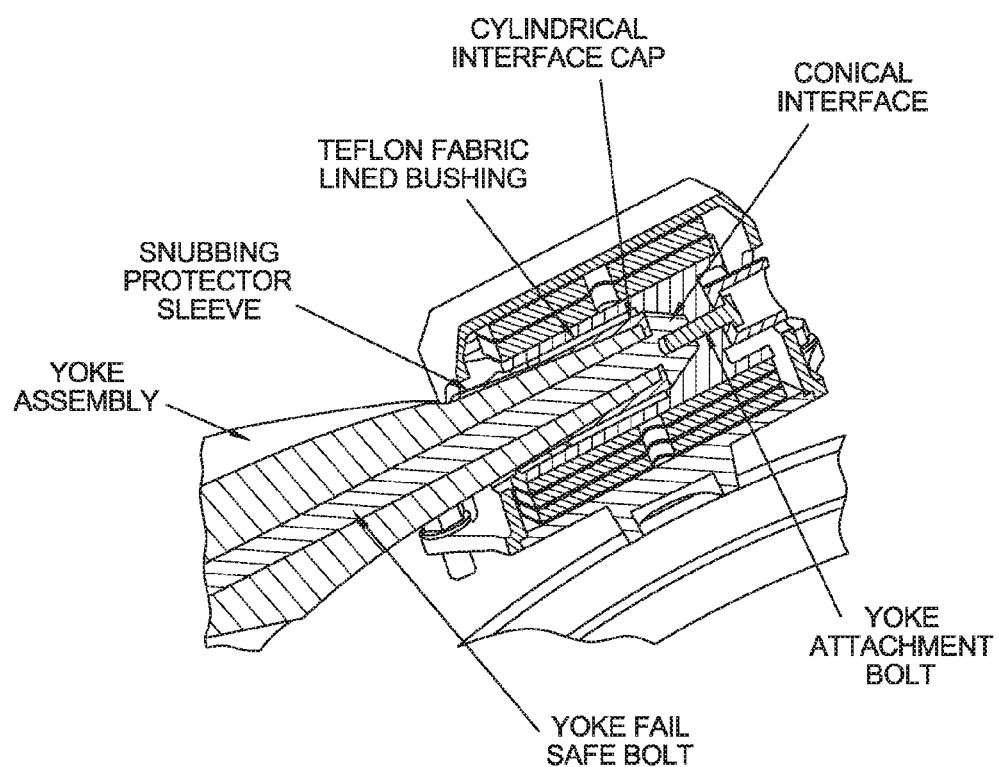
FIG. 39 illustrates the integral fitting yoke into the mount with the yoke arm bolt receiving yoke attachment bolt fastener.
Figure 40:
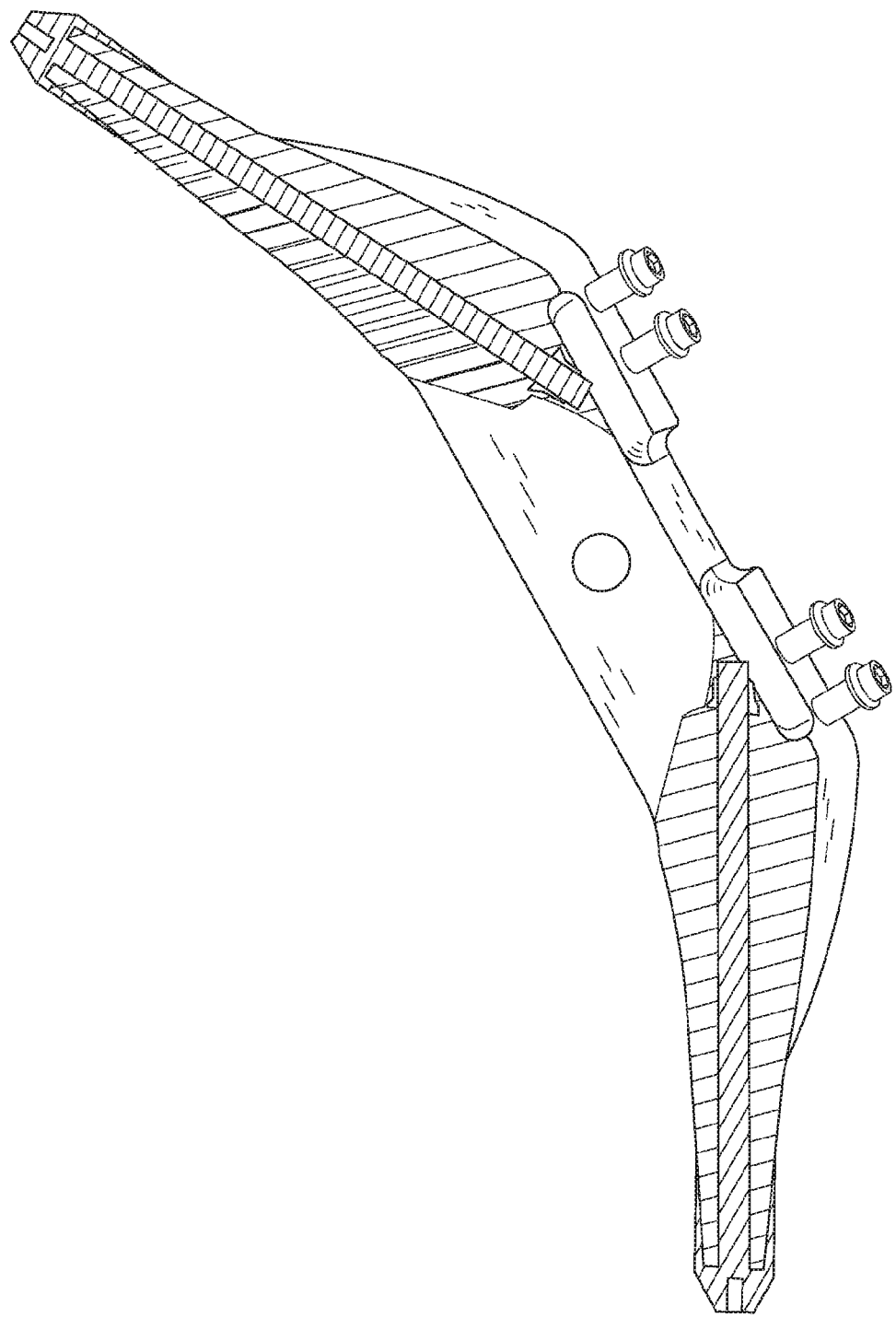
FIG. 40 illustrates a cross-section of the yoke showing engine end yoke arm bolts.
Figure 41:
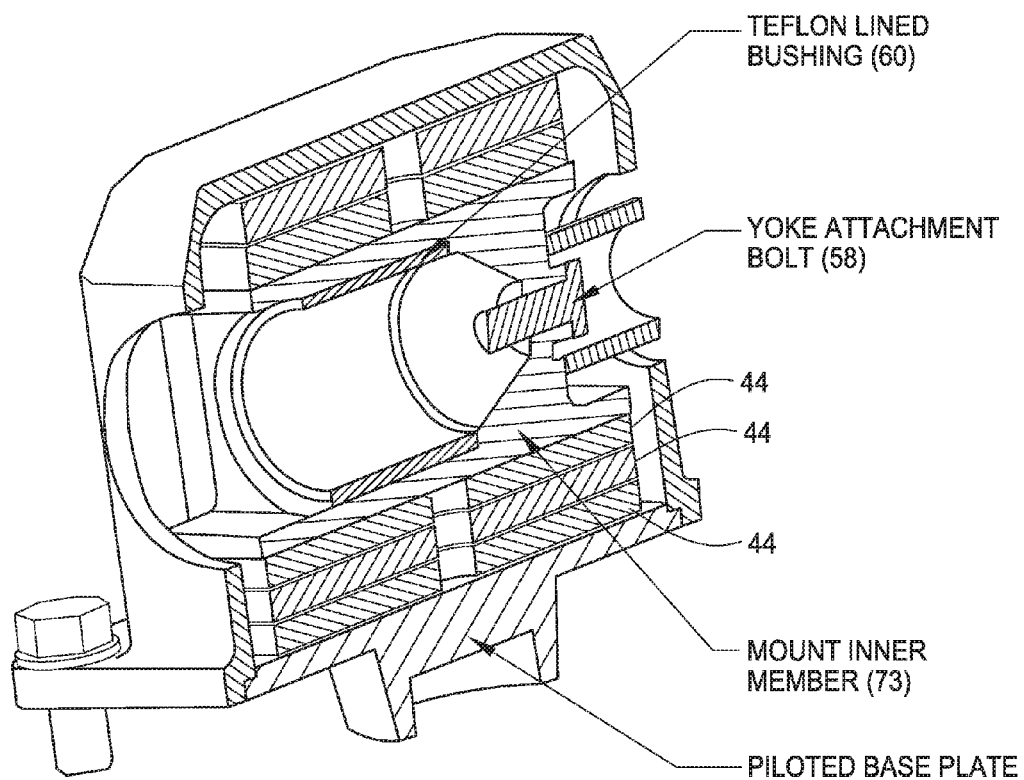
FIG. 41 illustrates an internal sectional view of a forward mount with the yoke attachment bolt fastener for reception in the yoke arm bolt end.
Figure 42:
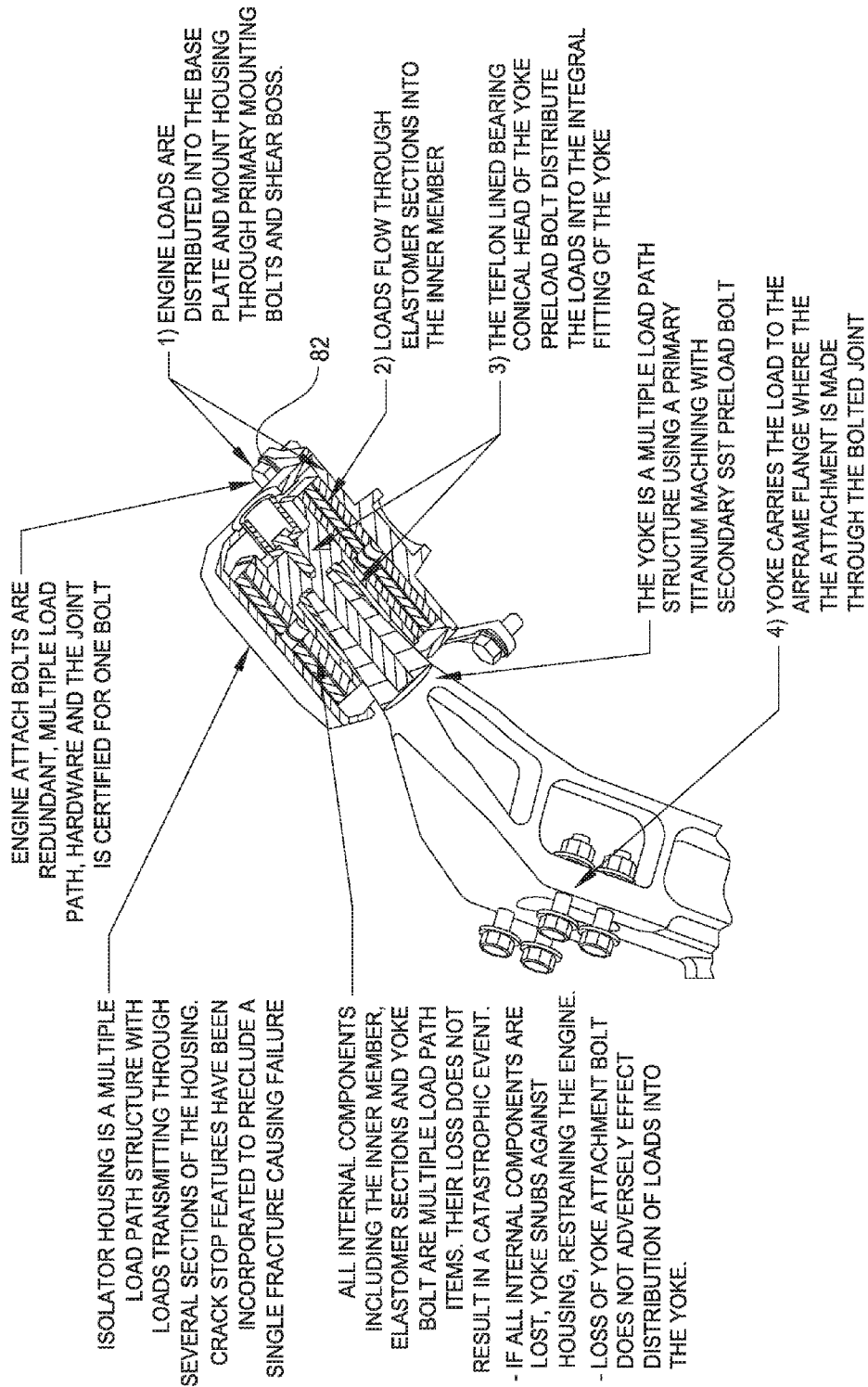
FIG. 42 illustrates the forward mounting system load path.
Figure 43:
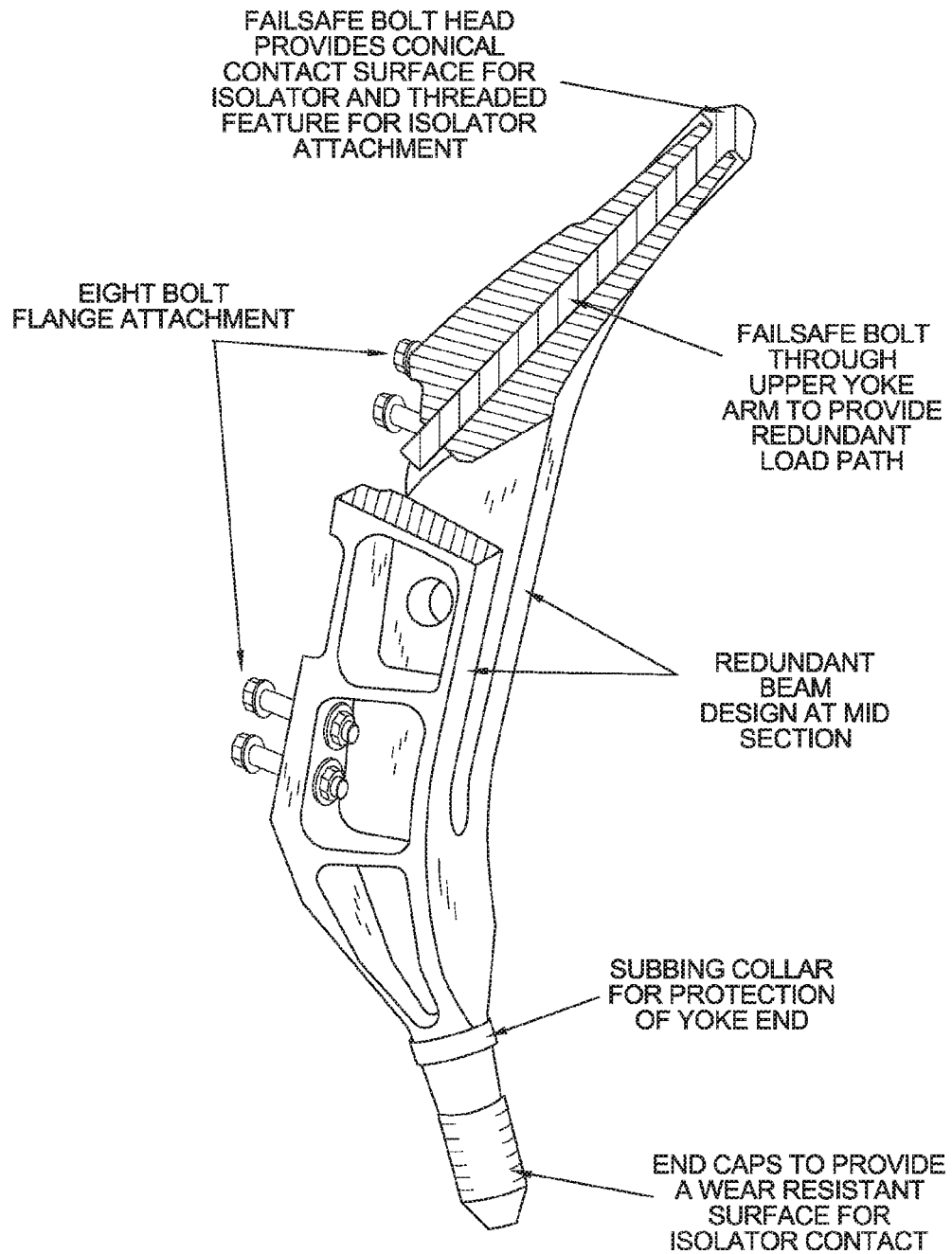
FIG. 43 illustrates the yoke with the engine end yoke arm bolts.
Figure 44:
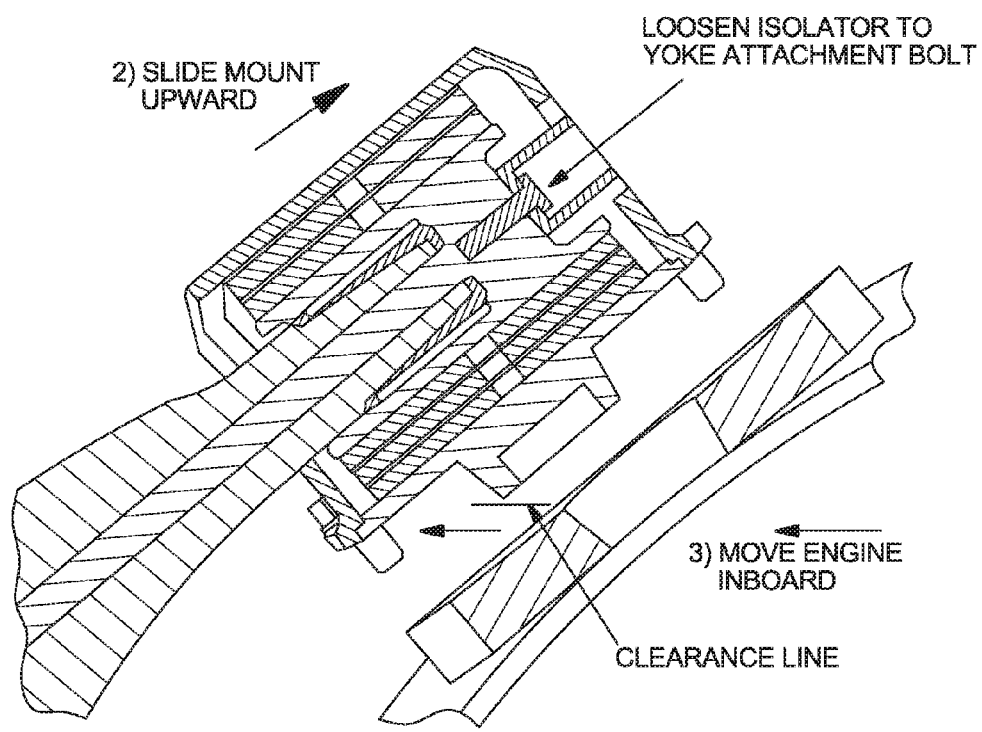
FIGS. 44 and 45 illustrate the installation method of the yoke.
Figure 45:
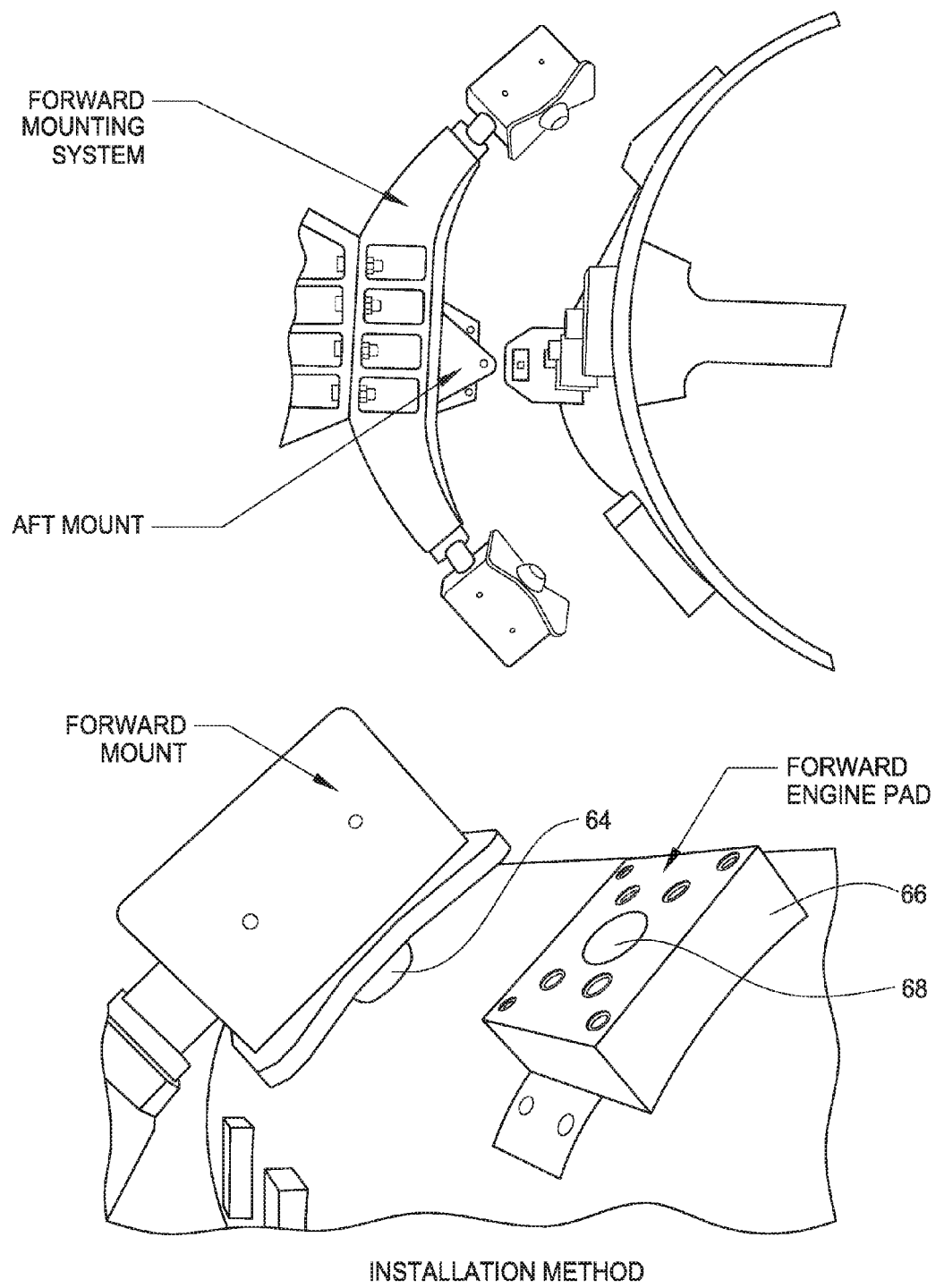

The above discussion focused on the forward mount component of engine mounting system 20. The aft mount 90 is a conventional design as provided in FIGS. 31 and 33-34.

Having described the optional embodiments of the components in engine mounting system 20, the following discussion will describe the application of the components in securing an aircraft engine 22 to yoke member 26. As noted above, engine mounts 36, 40 may be configured as soft mounts or hard mounts. The various embodiments of engine mounting system 20 may incorporate two hard mounts, two soft mounts or one hard mount and one soft mount with either mount associated with end 28.

When using two engine mounts 36, 40 configured as soft mounts, at least one engine mount 36 or 40 will include bolt 58 secured within end 28 or 30. However, in an optional embodiment, the relationship of MS to YL may permit the omission of bolt 58 from both engine mounts 36, 40. In another optional embodiment, both engine mounts 36, 40 may include bolt 58 securing yoke member 26 to inner member 73, i.e. cylinder 73 within engine mount housing 38 (42). Since the soft mount configuration provides sufficient flexibility to accommodate tangential thermal expansion, each end 28, 30 may be secured by a bolt 58. Thus, cylinder 73 preferably has an inside diameter sufficient to allow end 28 (30) to slide within cylinder 73. As a further option, polytetrafluoroethylene bushings 60, 62 may be place around cylinder 73 thereby further promoting a sliding relationship of cylinder 73 within damping component 44.

Figure 19:
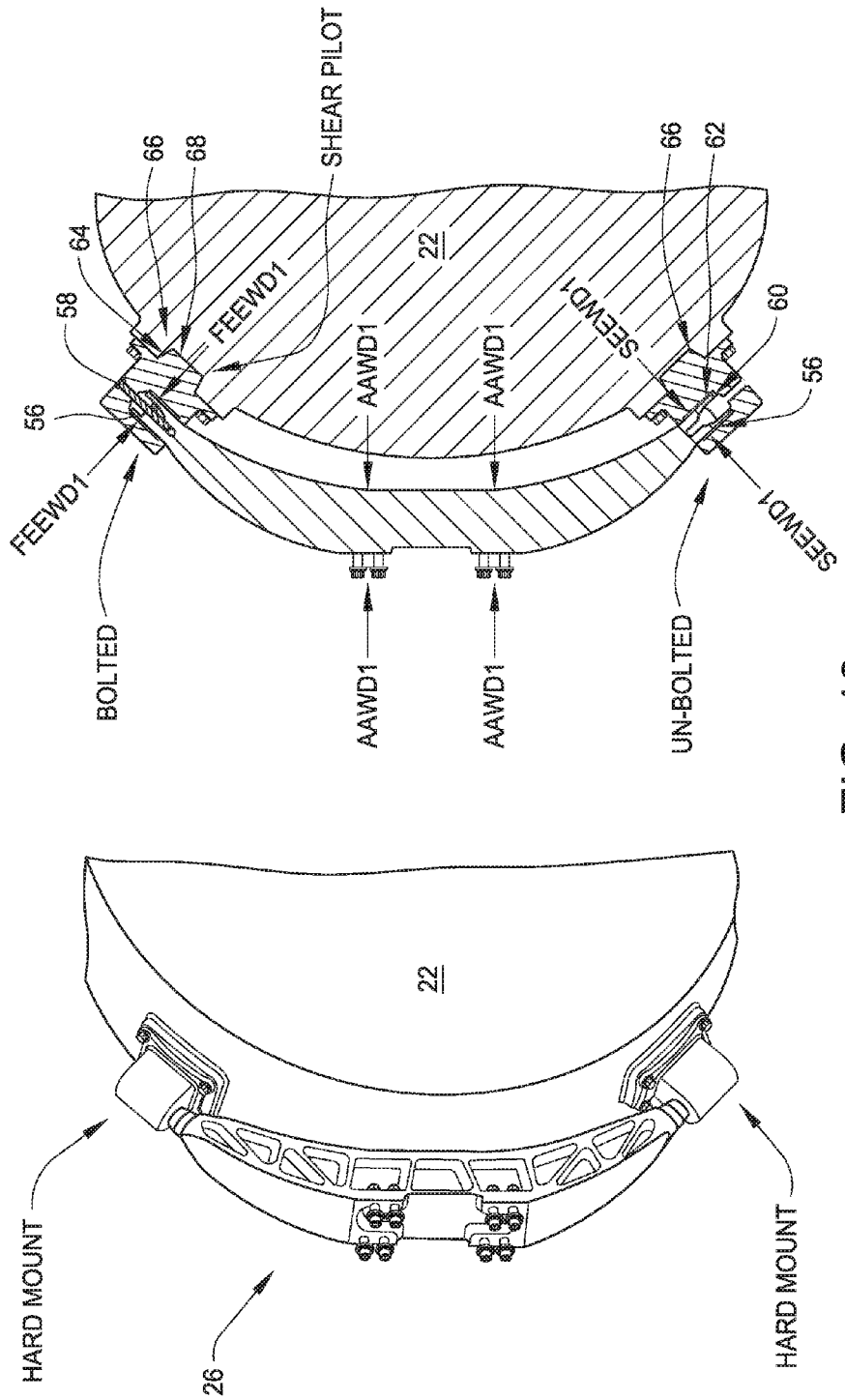
FIG. 19 illustrates the yoke member captured by the engine mounting system using two hard mounts.
Figure 21:
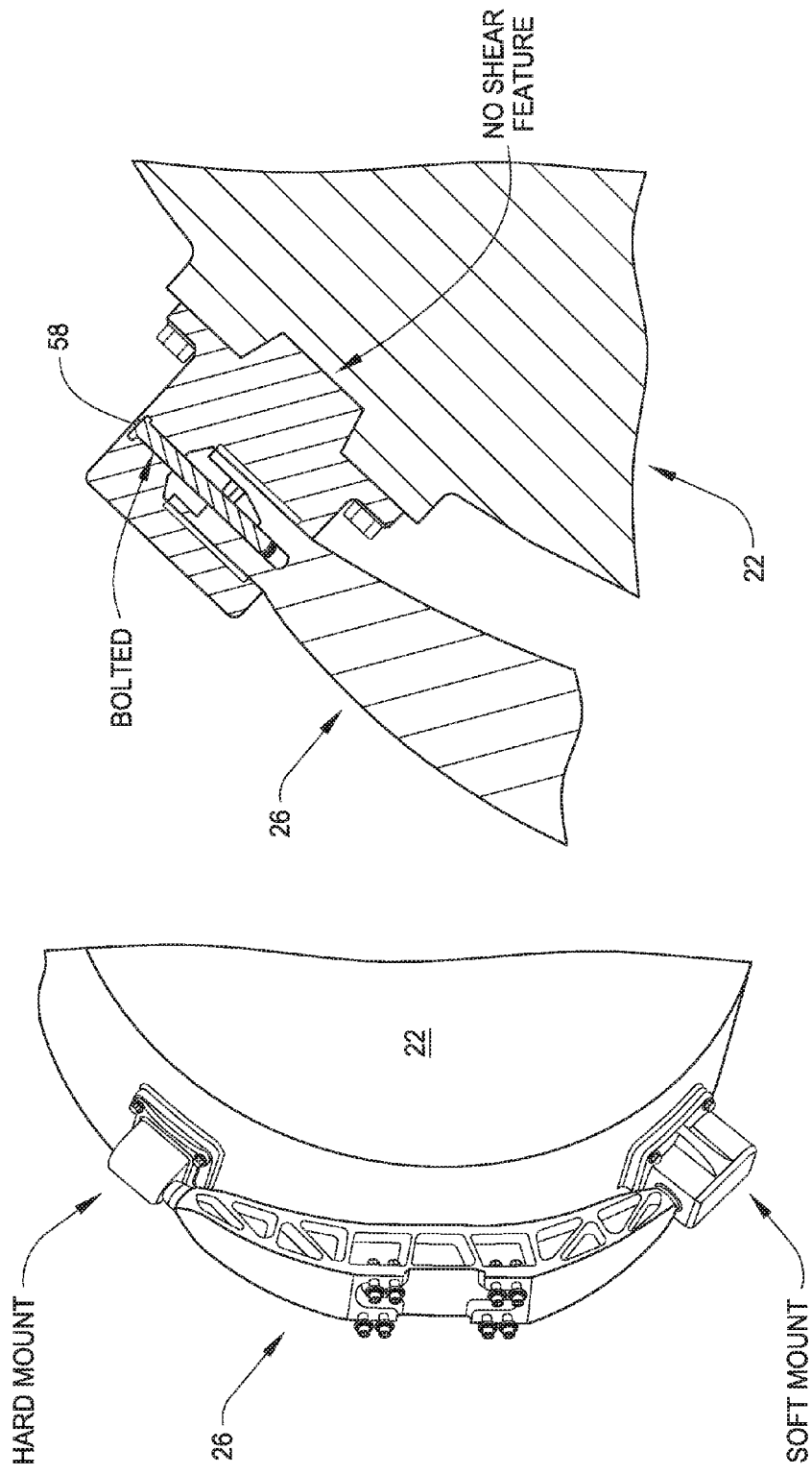
FIG. 21 illustrates an alternative of the yoke member captured by the engine mounting system using one soft mount and one hard mount.
Figure 22:
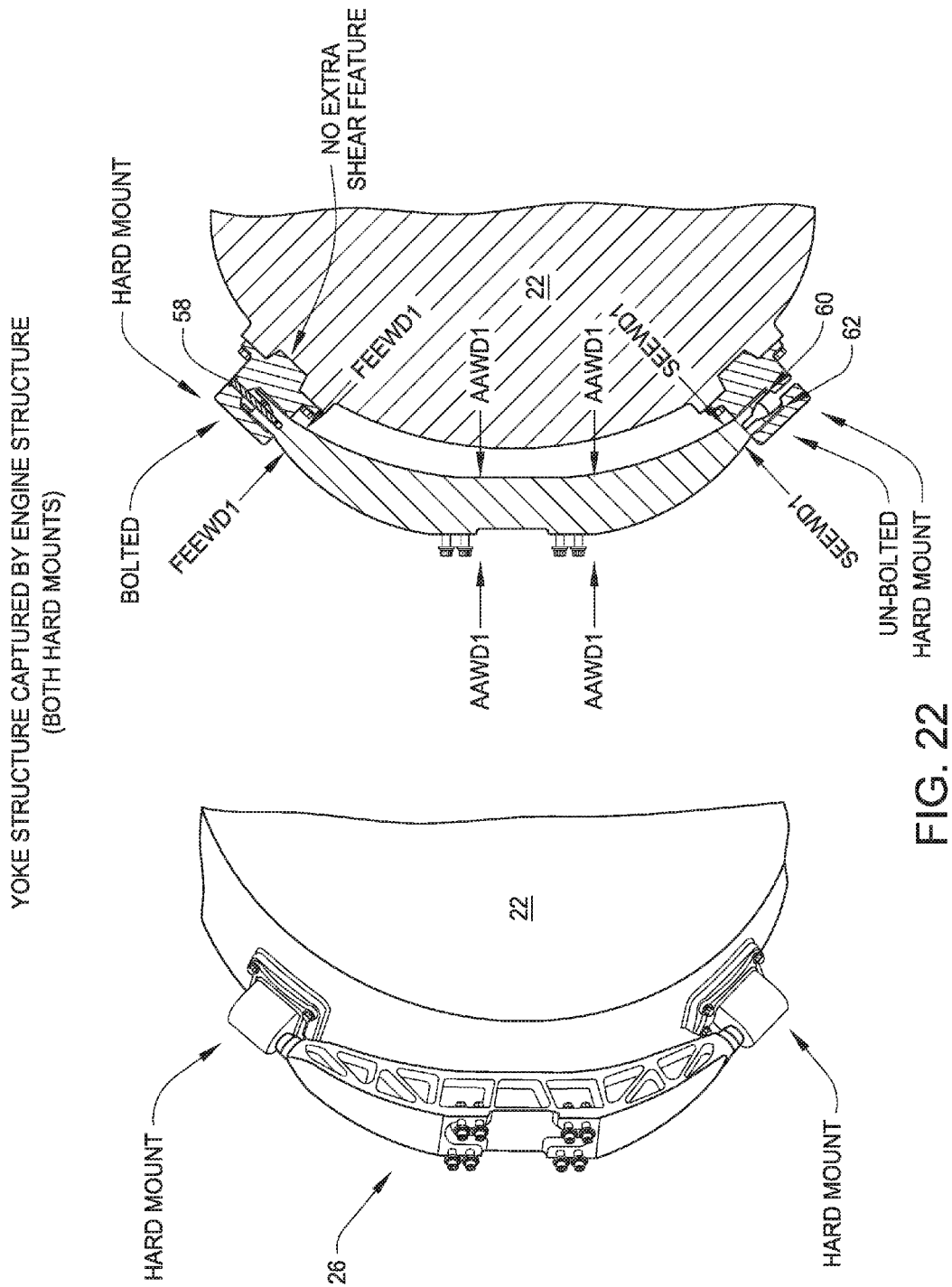
FIG. 22 illustrates an alternative of the yoke member captured by the engine mounting system using two hard mounts.
Figure 23:
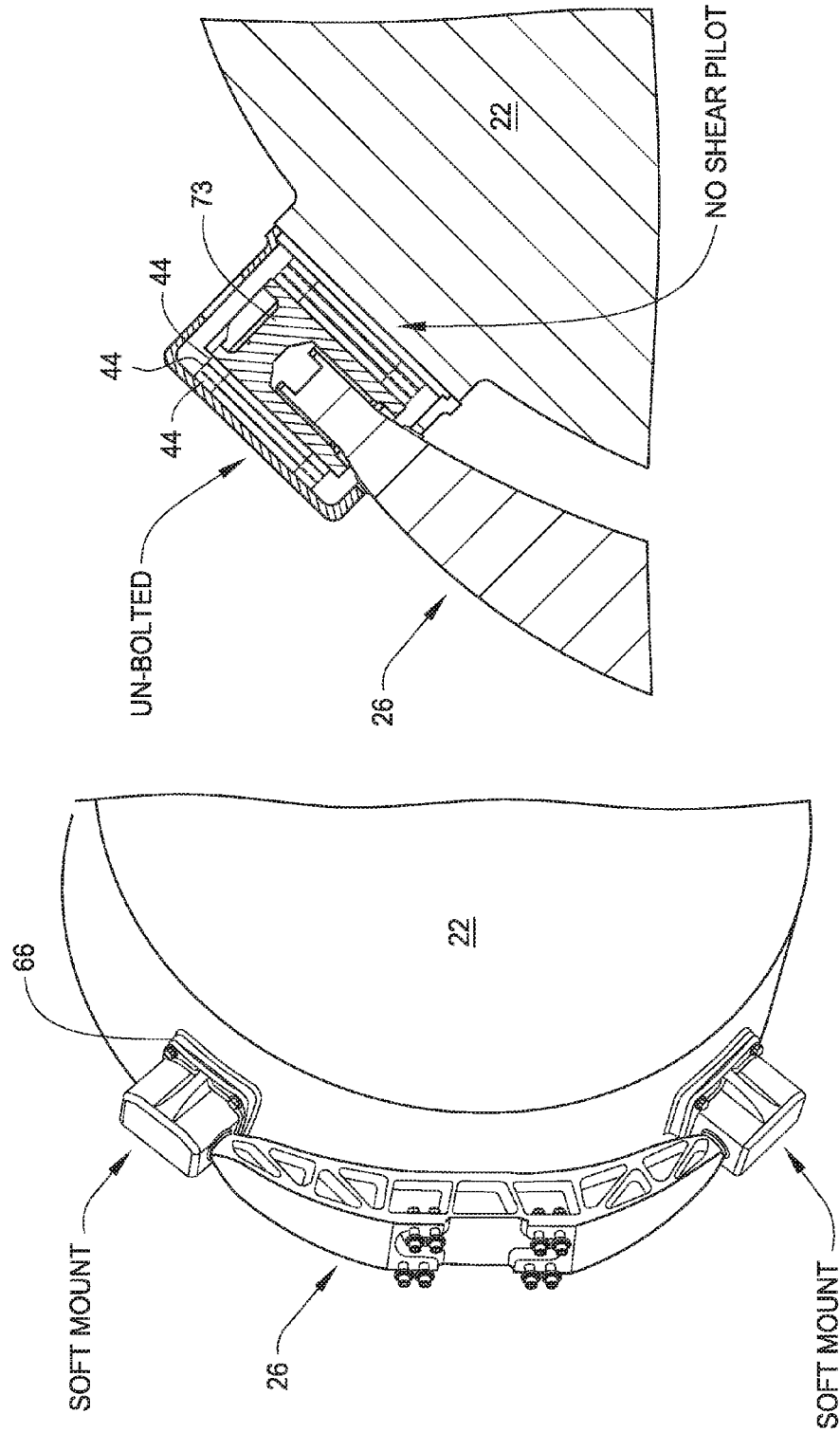
FIG. 23 illustrates an alternative of the yoke member captured by the engine mounting system using two soft mounts.
Figure 24:
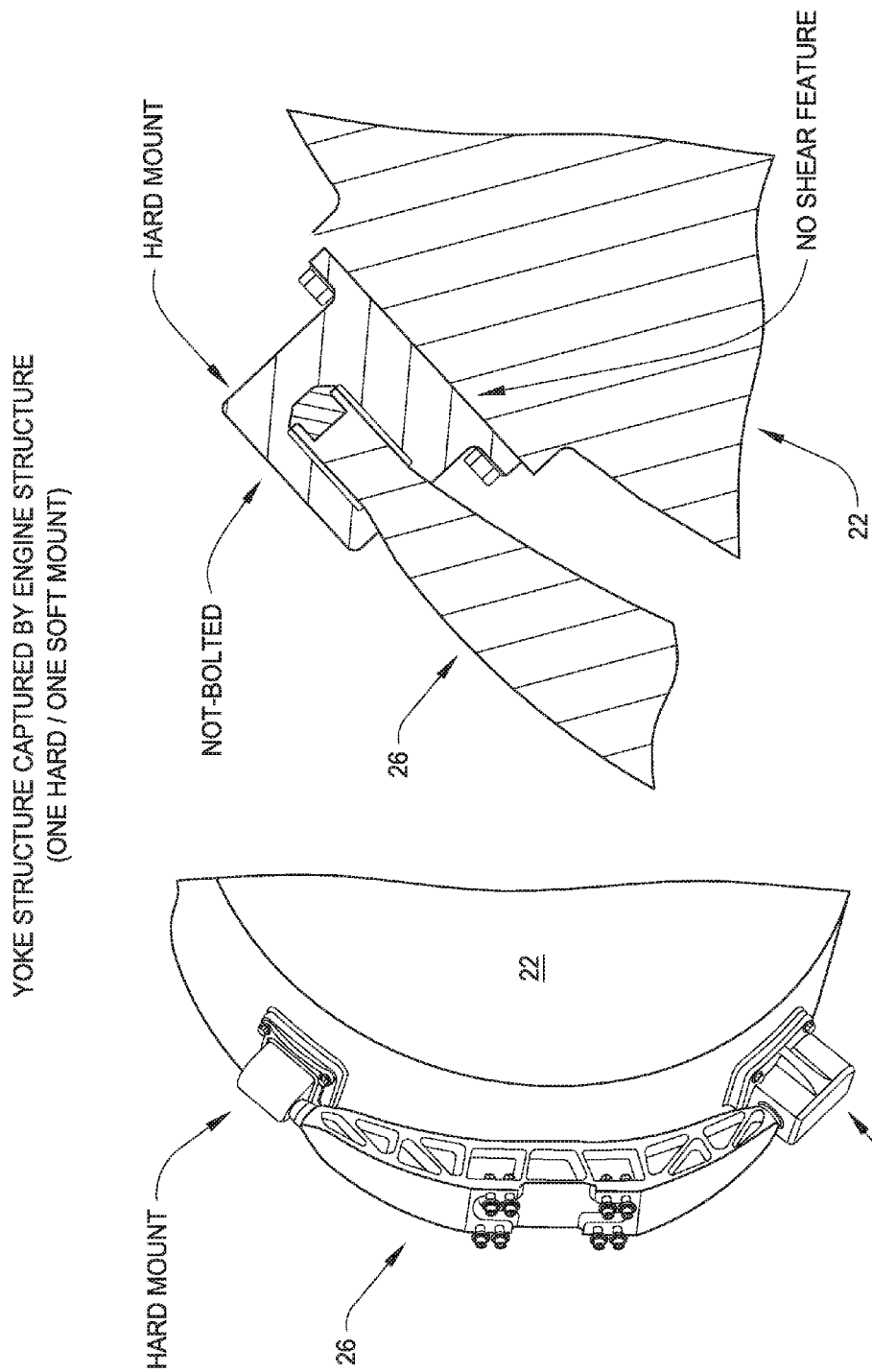
FIG. 24 illustrates an alternative of the yoke member captured by the engine mounting system using one soft mount and one hard mount.
Figure 25:
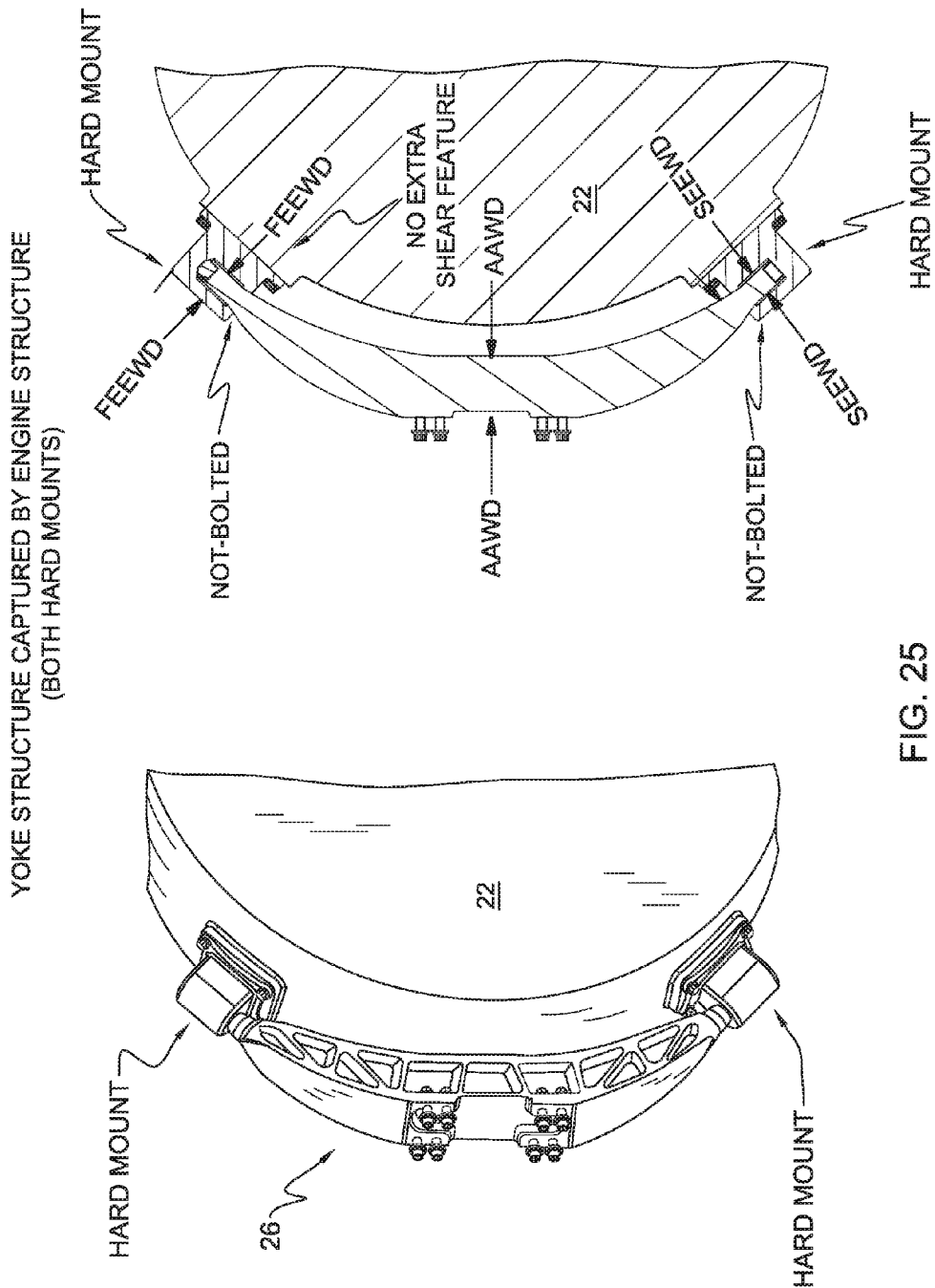
FIG. 25 illustrates an alternative of the yoke member captured by the engine mounting system using two hard mounts.
Figure 26:
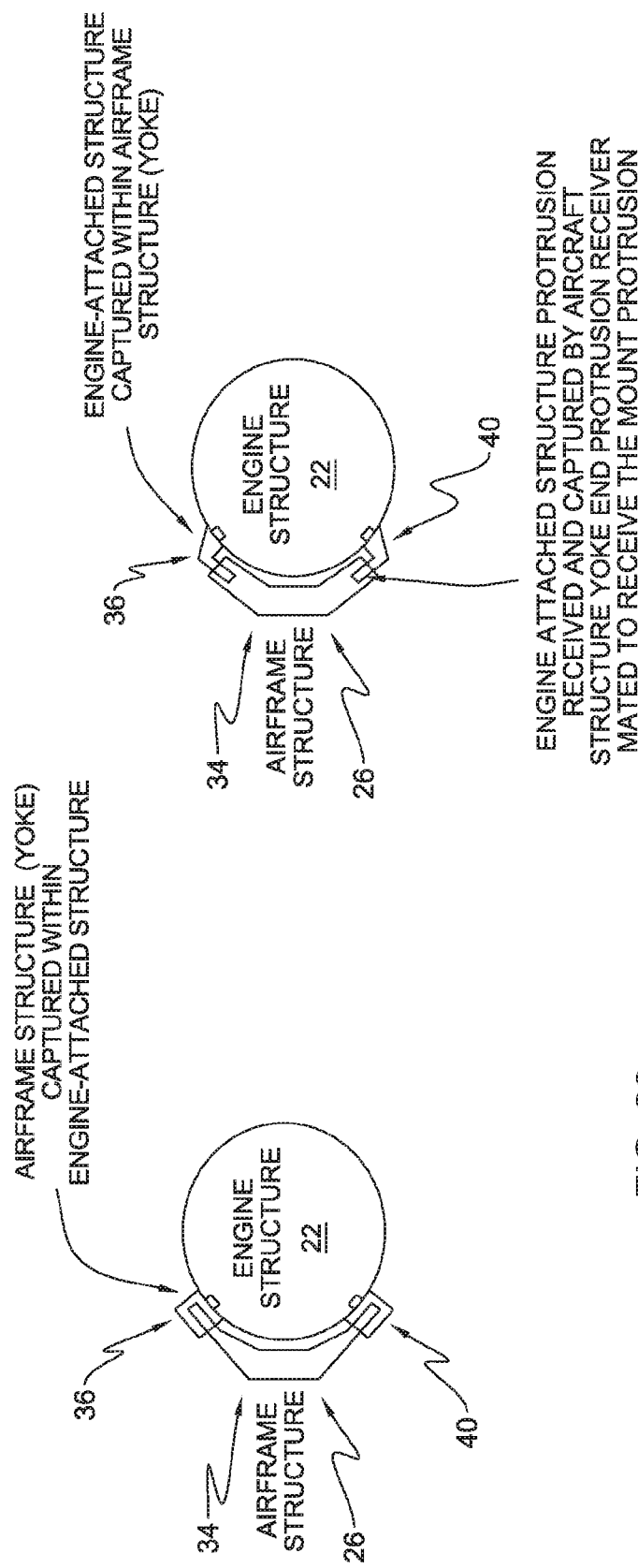
FIG. 26 illustrates the interlocking capture of the engine mounting system.
Figure 27:
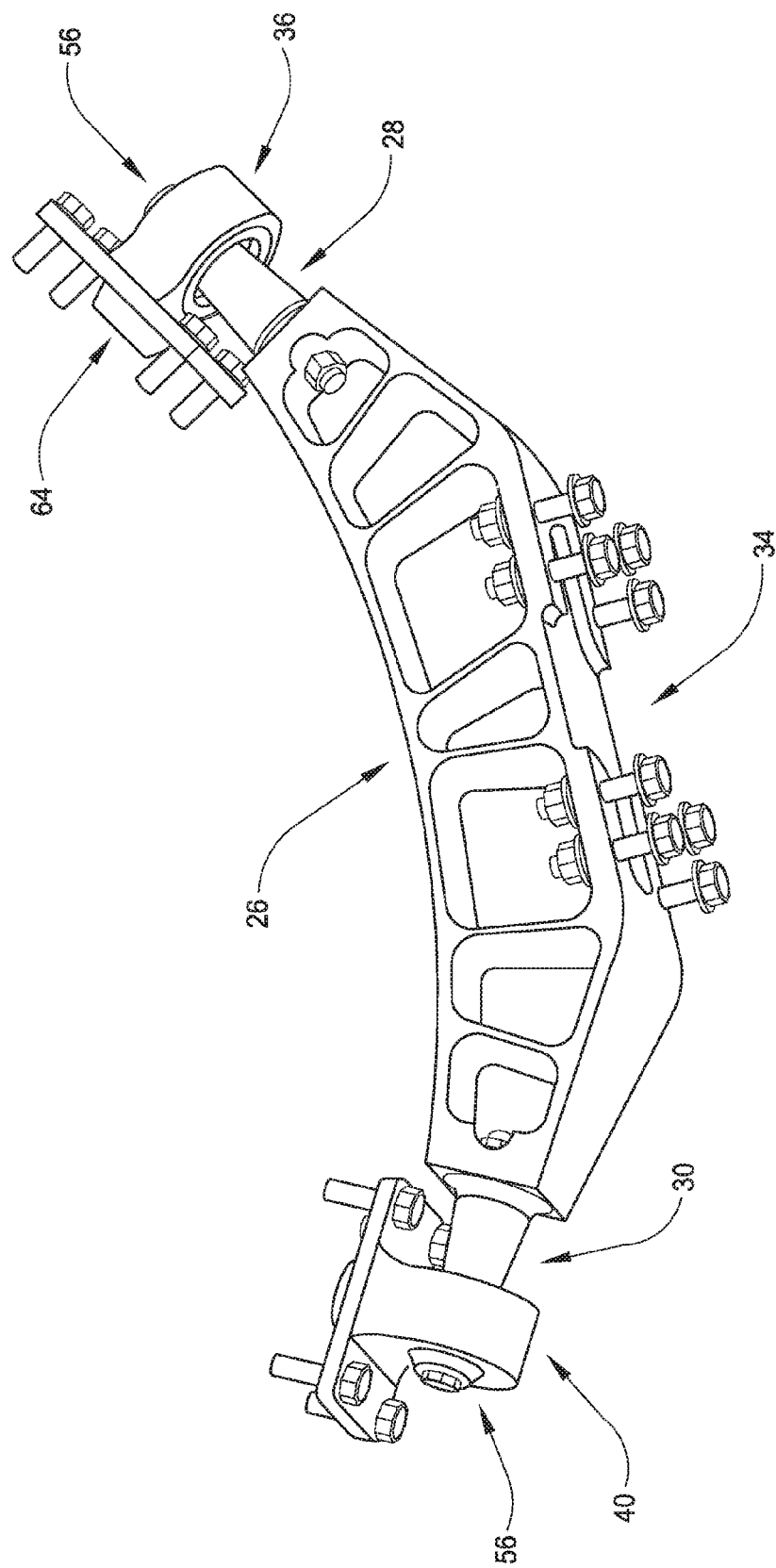
FIG. 27 illustrates an alternative embodiment of the yoke member.

When using two engine mounts 36, 40 configured as hard mounts, only one engine mount 36 or 40 will include bolt 58. The hard mount configuration does not provide sufficient tangential thermal expansion with both engine mounts rigidly secured to yoke member 26. However, with only one engine mount 36 or 40 rigidly secured by bolt 58 the other engine mount 36 or 40 will be free to slide within bearing 92 or 95 on bushing 60. Thus, as depicted in FIG. 19, upper engine mount 36 is rigidly secured to yoke member 26 by bolt 58 while lower engine mount 40 slidably engages end 30 of yoke member 26.

In another embodiment, engine mounting system 20 may have a configuration of engine mounts 36, 40 wherein one mount is a soft mount and the other mount is a hard mount. In this configuration either mount 36, 40 may be rigidly secured by bolt 58 to yoke member 26. However, to ensure sufficient tangential thermal expansion, only one mount 36 or 40 will be secured by bolt 58 to yoke member 26. Most commonly, bolt 58 will be placed in the mounting having a hard mount configuration.

To mount aircraft engine 22 to aircraft 24 using engine mounting system 20, one will initially install yoke member 26 to aircraft 24 using aircraft attachment point 34. Subsequently, engine mounts 36, 40 will be placed on respective ends 28, 30 of yoke member 26 in a loose, i.e. sliding relationship. If used, bolt 58 may be placed loosely in either end 28 or 30. However, in most configurations bolt 58 will be position and secured within end 28 or 30 following assembly. Bolts are placed within mounting points 82 of engine mounts 36, 40 ready for engaging engine mounting mate 66. Alternatively, engine mounting mate 66 may carry studs which will pass through mounting points 82 of engine mounts 36, 40 for engagement by nuts. The sliding relationship of engine mounts 36, 40 on yoke member 26 permits the easy alignment of each mount 36, 40 with the respective engine mounting mate 66 and location of alignment boss 64 within recess 68 of engine mounting mate 66. The sliding relationship of engine mounts 36, 40 permits the movement of aircraft engine 22 laterally inward to yoke member 26 as mounts 36, 40 can slide tangentially to allow for engagement of recess 68 by alignment boss 64 of each mount 36, 40. As noted above, the conical nature of alignment boss 64 enhances the ability of each mount 36, 40 to laterally engage each mounting mate 66. In most embodiments, following securement of each engine mount 36, 40 to respective engine mounting mates 66, one bolt 58 will be placed within one of engine mounts 36 or 40 consistent with the types (soft or hard) of engine mounts used in engine mounting system 20.

As described above, engine mounting system 20 substantially improves safety for those installing aircraft engines by elimination or reducing pinch points between components. Additionally, during operation of the aircraft 24, engine mounting system 20 improves operational safety by providing a mounting system having interlocking metal components which ensure the retention of aircraft engine 22 even in the event of a partial failure of a component.

Other embodiments of the present invention will be apparent to one skilled in the art. As such, the foregoing description merely enables and describes the general uses and methods of the present invention. Accordingly, the following claims define the true scope of the present invention.

What is claimed is:

1. An aircraft engine mounting system (20) for mounting an aircraft engine (22) to an aircraft (24), said aircraft engine mounting system (20) comprising:
    a yoke member (26) having a first end (28) and a second end (30), with an aircraft attachment (34) between said first end (28) and said second end (30), said aircraft attachment (34) for interfacing said yoke member (26) with said aircraft (24), said yoke member (26) having a yoke member length YL from said first end (28) to said second end (30);
    a first engine mount (36), said yoke member (26) first end (28) contained by said first engine mount (36), with said first engine mount (36) having an outer engine mount housing (38) grounded to said aircraft engine (22);
    a second engine mount (40), said second end (30) contained by said second engine mount (40), with said second engine mount having an outer engine mount housing (42) grounded to said aircraft engine (22);
    said first engine mount (36) and said second engine mount (40) grounded to said aircraft engine (22) with a mounts spacing (MS) between said first engine mount (36) and said second engine mount (40) interlocking said yoke member between said first engine mount (36) and said second engine mount (40); and
    wherein said yoke member (26) has an aircraft attachment width dimension (AAWD2), a first engine end width dimension (FEEWD2), and a second engine end width dimension (SEEWD2), with AAWD2>FEEWD2 and AAWD2>SEEWD2.

2. A system as claimed in claim 1 including a fastener (58), said fastener (58) inhibiting a relative sliding interface between said yoke member (26) and said first end (28).

3. A system as claimed in claim 1 including a first bushing (60) and a second bushing (62), said second bushing (62) adjacent said first bushing (60) wherein said first bushing (60) is slidable a sliding distance relative to said second bushing (62).

4. A system as claimed in claim 1 wherein said first engine mount (36) includes an alignment boss (64).

5. A method of attaching an aircraft engine (22) to an aircraft (24), said method comprising:
provided a yoke member (26) having a first end (28) and a second end (30), with an aircraft attachment point (34) between said first end (28) and said second end (30), said yoke member (26) having a yoke member YL from said first end (28) to said second end (30), said yoke member (26) having an aircraft attachment width dimension (AAWD2), a first engine end width dimension (FEEWD2), and a second engine end width dimension (SEEWD2), with AAWD2>FEEWD2 and AAWD2>SEEWD2;
providing a first engine mount (36);
providing a second engine mount (40);
providing an aircraft engine (22), said aircraft engine (22) having a first engine mounting mate (66) for mating with an alignment boss (64) carried by said first engine mount (36);
said aircraft engine (22) having a second mounting mate (66) for mating with said second engine mount (40), said first engine mounting mate (66) spaced from said second engine mounting mate (66) to provide a mounting mate spacing MMS);
connecting said yoke member (26) to said aircraft engine (22) with said first engine mount (36) and said second engine mount (40) wherein said first engine mounting mating (66) mates with said first engine mount (36) and said second engine mounting mating member (66) mates with said second engine mount (40), wherein said first end (28) and second end (30) of said yoke member (26) are contained by the respective first and second engine mounts, with said yoke member (26) interlocked between said first engine mount (36) and said second engine mount (40).

6. A method as claimed in claim 5, wherein connecting said yoke member (26) to said aircraft engine (22) with said first engine mount (36) and said second engine mount (40) includes, movably attaching said first engine mount (36) on said yoke member (26) first end (28).

7. A method as claimed in claim 6, including fixedly fastening said movably attached first engine mount (36) with said yoke member (26) first engine end (28) after said first mounting mating (66) is mated with said alignment boss (64) of said first engine mount (36).

8. A method as claimed in claim 5, wherein providing a first engine mount (36) includes providing a first engine mount (36) with first engine mount housing (38) for receiving and containing said yoke member (26) first end (28).

9. A method as claimed in claim 5, wherein providing a first engine mount (36) includes providing a first engine mount (36) with first engine mount housing (38) for receiving and containing said yoke member (26) first end (28) and providing a second engine mount (40) includes providing a second engine mount (40) with second engine mount housing (42) for receiving and containing said yoke member (26) second end (30).

10. A method as claimed in claim 5, wherein providing a first engine mount (36) includes providing a first engine mount (36) with a first engine mount housing (38) having an inner member (73) configured to receive the first end 28 of said yoke member (26).

11. A method as claimed in claim 5, wherein providing a first engine mount (36) includes providing a first engine mount (36) with at least one damping component (44).

12. A method as claimed in claim 5, wherein including providing a first bushing (60) and a second bushing (62), said second bushing (62) adjacent said first bushing (60) wherein said first bushing (60) is slidable a sliding distance relative to said second bushing (62).

* * * * *